United States Patent
Khan et al.

(10) Patent No.: US 12,320,433 B2
(45) Date of Patent: Jun. 3, 2025

(54) ACTUATOR ARRANGEMENT FOR MULTI-VALVE ASSEMBLY

(71) Applicant: Swagelok Company, Solon, OH (US)

(72) Inventors: Azmathullah Khan, Glendale Heights, IL (US); Michael L. Aughenbaugh, Glen Ellyn, IL (US); Andrew White, Lake in the Hills, IL (US); Cal R. Brown, Lyndhurst, OH (US)

(73) Assignee: SWAGELOK COMPANY, Solon, OH (US)

( * ) Notice: Subject to any disclaimer, the term of this patent is extended or adjusted under 35 U.S.C. 154(b) by 267 days.

(21) Appl. No.: 17/894,268

(22) Filed: Aug. 24, 2022

(65) Prior Publication Data

US 2023/0067297 A1    Mar. 2, 2023

Related U.S. Application Data

(60) Provisional application No. 63/236,860, filed on Aug. 25, 2021.

(51) Int. Cl.
*F16K 11/16*    (2006.01)
*F16K 31/53*    (2006.01)
*F16K 31/60*    (2006.01)

(52) U.S. Cl.
CPC .......... *F16K 11/165* (2013.01); *F16K 31/535* (2013.01); *F16K 31/602* (2013.01)

(58) Field of Classification Search
CPC .. F16K 11/165; F16K 11/0856; F16K 11/205; F16K 31/54; F16K 31/535; F16K 35/14
USPC ...................................................... 251/250
See application file for complete search history.

(56) References Cited

U.S. PATENT DOCUMENTS

| | | | |
|---|---|---|---|
| 1,107,635 A | 8/1914 | Wagner | |
| 2,307,838 A * | 1/1943 | Jacobsson | B64D 13/08 137/553 |
| 2,399,460 A | 4/1946 | Britton | |
| 3,834,372 A | 9/1974 | Turney | |
| 4,196,752 A | 4/1980 | Niskanen | |
| 4,960,127 A | 10/1990 | Noce et al. | |
| 6,668,860 B1 | 12/2003 | Pas et al. | |
| 8,082,947 B2 | 12/2011 | Chang et al. | |
| 9,004,106 B2 | 4/2015 | Schlichter et al. | |
| 9,222,597 B2 | 12/2015 | Asokan | |
| 10,465,819 B2 * | 11/2019 | Jansen | F16K 35/14 |
| 10,851,901 B2 | 12/2020 | Liberman et al. | |
| 2005/0072481 A1 | 4/2005 | Hanada et al. | |

(Continued)

FOREIGN PATENT DOCUMENTS

| DE | 4324867 | 1/1995 |
|---|---|---|
| DE | 202005009176 U1 | 7/2006 |

(Continued)

OTHER PUBLICATIONS

International Search Report and Written Opinion from PCT/US2022/041307 dated Jan. 24, 2023.

*Primary Examiner* — Reinaldo Sanchez-Medina
*Assistant Examiner* — Nicole Gardner
(74) *Attorney, Agent, or Firm* — Calfee, Halter & Griswold LLP

(57) ABSTRACT

A valve assembly includes multiple valves operatively connected with a single valve actuator operable to control and restrict the corresponding positions of each of the multiple valves.

19 Claims, 32 Drawing Sheets

(56) References Cited

U.S. PATENT DOCUMENTS

2009/0050830 A1    2/2009  Albert et al.
2013/0025725 A1*  1/2013  Gotch .................... F16K 11/20
                                                                         137/883
2013/0061968 A1    3/2013  Schlichter et al.

FOREIGN PATENT DOCUMENTS

| FR | 2926126 A1 | 7/2009 |
| GB | 2236829 | 4/1991 |
| KR | 10-1414140 | 7/2014 |
| WO | 2012/129600 | 10/2012 |

* cited by examiner

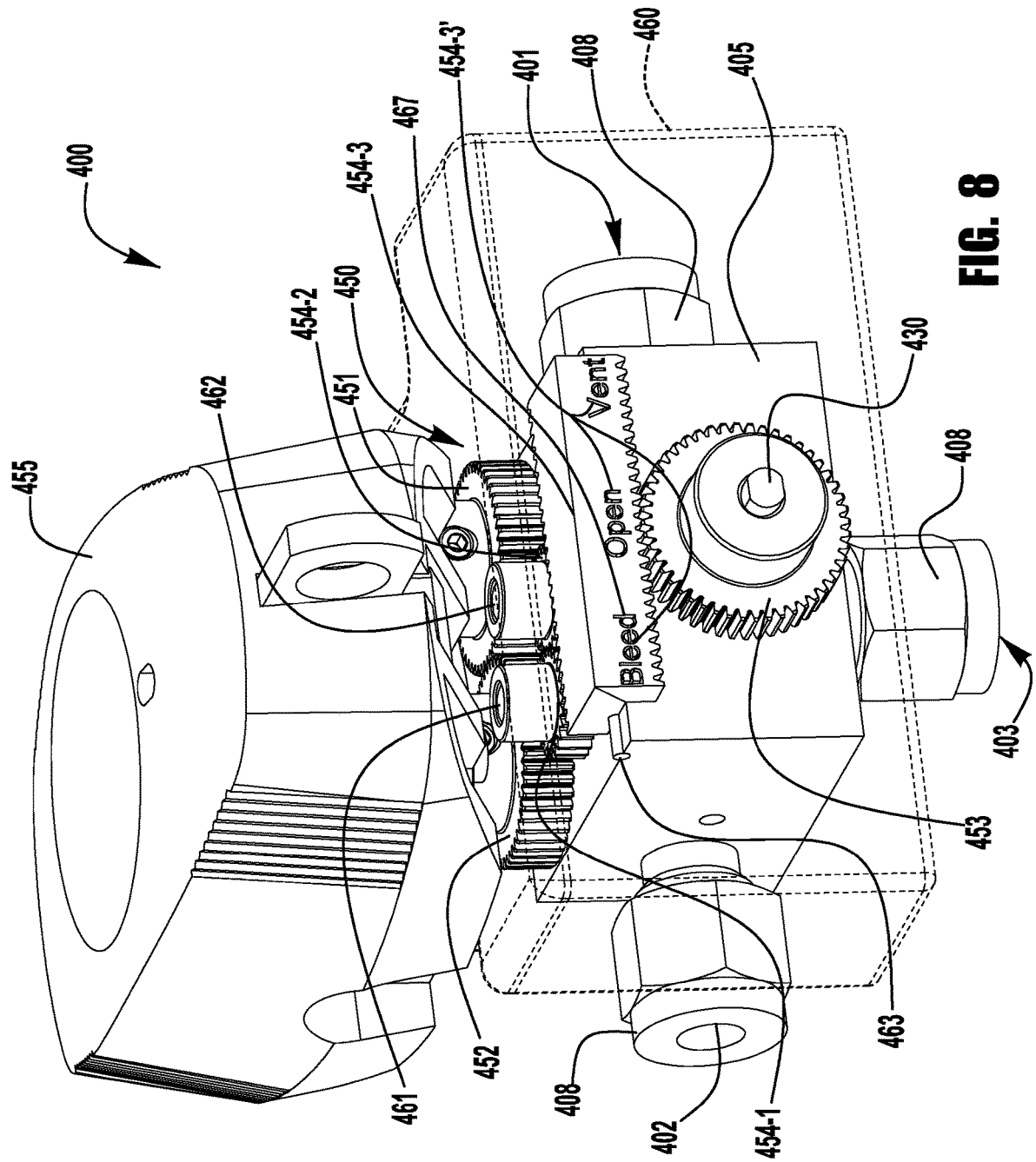

ACTUATOR ARRANGEMENT FOR MULTI-VALVE ASSEMBLY

CROSS-REFERENCE TO RELATED APPLICATION

This application claims priority to and all benefit of U.S. Provisional Patent Application Ser. No. 63/236,860, filed on Aug. 25, 2021, for ACTUATOR ARRANGEMENT FOR MULTI-VALVE ASSEMBLY, the entire disclosure of which is incorporated herein by reference.

FIELD OF THE INVENTION

The present application relates to valve assemblies. More particularly, in an exemplary embodiment, the application relates to valve assemblies that can be used to sample fluid from a process piping system.

BACKGROUND

Multiple valve arrangements are often used in systems requiring specific combinations of valve flow conditions or porting configurations to perform desired fluid system functions. As one example, double block and bleed three-valve manifolds utilize first (upstream) and second (downstream) shutoff or "block" valves operable to seal off upstream and downstream fluid lines (e.g., prior to maintenance on downstream equipment), and a bleed valve disposed between the first and second block valves and operable to safely vent or bleed off pressurized fluid when the block valve are in the closed or shutoff position.

In using conventional double block and bleed valve manifold arrangements, prior to performing maintenance on a downstream fluid component, the upstream block valve is closed (e.g., by actuating an upstream block valve handle) to shut off upstream fluid flow, the downstream block valve is closed (e.g., by actuating a downstream block valve handle) to isolate the downstream fluid components, and the bleed valve is opened (e.g., by actuating a bleed valve handle).

In such an arrangement, it may be important to ensure that the bleed valve remain closed when the first and second block valves are open ("open flowpath configuration"), and that the bleed valve be open when the first and second block valves are closed to bleed fluid between the block valves through the bleed valve to a vent port ("bleed configuration"). In some such arrangements, a third configuration or "downstream vent" configuration may be provided in which the first and second block valves are closed to shutoff the flowpath, but the bleed valve and downstream block valve are ported for venting fluid from the internal valve passage, through the second block valve to the downstream fluid line.

SUMMARY

According to an aspect of one or more of the inventions, a valve assembly including a first valve (e.g., upstream block valve), a second valve (e.g., downstream block valve), and a third valve (e.g., bleed valve) may be provided with a single actuator operable to control and restrict the corresponding positions of the first, second, and third valves.

In accordance with an embodiment of one or more of the inventions presented in this disclosure, a valve assembly includes a valve body, first, second and third valve elements, and a valve actuator. The valve body defines a first end passage extending to a first end port, a second end passage extending to a second end port, an internal through passage extending between the first and second end passages, and a bleed passage extending to a vent port. The first valve element is disposed in the first end passage and defines a first valve passage. The second valve element is disposed in the second end passage and defines a second valve passage. The third valve element is disposed in the bleed passage and defines a third valve passage. The valve actuator is operatively connected with each of the first, second, and third valve elements and is movable between first, second, and third positions. The first position corresponds to an open flowpath configuration in which the first and second valve elements are in an open position permitting fluid flow between the first end port and the second end port, and the third valve element is in a closed position blocking flow between the internal through passage and the vent port. The second position corresponds to a bleed configuration in which the first and second valve elements are in a first closed position blocking flow between the first and second end ports and the internal through passage, with the first and second valve passages being open to the internal through passage, and the third valve element is in a first switching position permitting fluid flow between the internal through passage and the vent port. The third position corresponds to a downstream vent configuration in which the first and second valve elements are in a second closed position blocking flow between the first and second end ports and the internal through passage, with the second valve passage being open to the second end port, and the third valve element is in a second switching position permitting fluid flow between the internal through passage and the second valve passage.

In accordance with another embodiment of one or more of the inventions presented in this disclosure, a valve assembly includes a valve body, a first valve element assembled with the valve body and rotatable about a first valve axis, a second valve element assembled with the valve body and rotatable about a second valve axis perpendicular to the first valve axis, and a valve actuator operatively connected with each of the first and second valve elements, the valve actuator being rotatable about a actuator axis for rotation of the first and second valve elements between first and second positions.

In accordance with another embodiment of one or more of the inventions presented in this disclosure, a valve assembly includes first, second, and third rotatable valve elements and a valve actuator operatively connected with each of the first, second, and third valve elements for rotation of each of the first, second, and third valve elements from a first position and a second position when the valve actuator is rotated from a first position to a second position. The valve actuator is disengageable from at least one of the first, second, and third valve elements when the valve actuator is rotated from the second position to a third position, such that the at least one of the first, second, and third valve elements remains in the second position and the others of the first, second, and third valve elements are rotated to a third position.

In accordance with another embodiment of one or more of the inventions presented in this disclosure, a valve assembly includes a valve body, first and second valve elements, and a valve actuator. The valve body defines a first end passage extending to a first end port, a second end passage extending to a second end port, an internal through passage extending between the first and second end passages, and a bleed passage extending to a vent port. The first valve element is disposed between the first and second end passages and defines a first valve passage. The second valve element is disposed in the bleed passage and defines a second valve passage. The valve actuator is operatively connected with each of the first and second valve elements, and is movable between: a first position corresponding to an open flowpath configuration in which the first valve element is in an open position permitting fluid flow between the first end port and the second end port, and the second valve element is in a closed position blocking flow between the internal through passage and the vent port; and a second position corresponding to a downstream vent configuration in which the first valve element is in a closed position blocking flow between the first and second end ports, and the second valve element is in a venting position permitting fluid flow between the second end port and the vent port.

BRIEF DESCRIPTION OF THE DRAWINGS

FIG. 8 is an upper front perspective view of an exemplary three-valve double block and bleed assembly having a single actuator mechanism, according to another exemplary embodiment of the present disclosure, shown with the casing in phantom to illustrate additional features of the assembly;

DESCRIPTION OF THE EXEMPLARY EMBODIMENTS

Figure 1A:
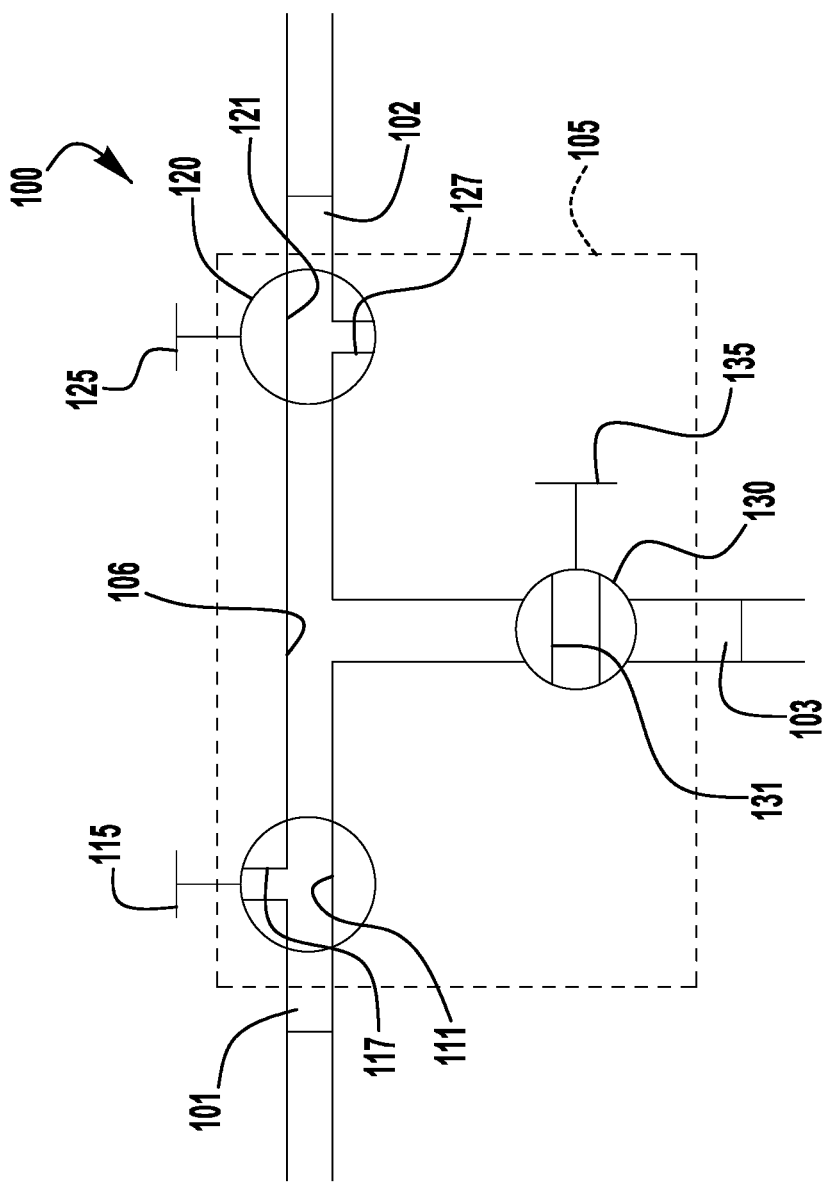
FIG. 1A is a schematic view of a three-valve double block and bleed assembly, shown in an open or "on" configuration.

While the inventions are described herein with specific reference to a variety of structural and material features, such descriptions are intended to be exemplary in nature and should not be construed in a limiting sense. For example, the exemplary embodiments are described primarily in terms of manually actuated ball valve assemblies provided with user rotatable handle actuators. Those skilled in the art, however, will readily appreciate that any one or more of the aspects and features of the inventions may be used with valve assemblies that include one or more of a wide variety of different types of valves (e.g., plug, gate, diaphragm, or needle valves) or valve actuators (e.g., pneumatic or electric actuators). Further, the components of the process interface valve assemblies can be made from any suitable materials. For example, all of the components that contact the process fluid can be made from metal, such as stainless steel, carbon steel, duplex steel, or any other metal and/or from polymers, such as plastics (including, for example, PTFE, FEP, PFA, etc.) and elastomers. The materials of the components of the process interface valve assemblies can be selected based on the intended application.

Further, while the exemplary embodiments described herein are identified as double block and bleed ("DBB") and single block and bleed ("SBB") process interface valve assemblies for isolating fluid system components and safely bleeding or venting fluid pressure prior to removing or repairing the isolated components, other valve assemblies and systems may utilize one or more of the inventive features described in the present application. For example, other multi-valve element valve assemblies or manifolds may be configured to be operated using a valve actuator configured to operate two or more of the multiple valve elements.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present application may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

Figure 1B:
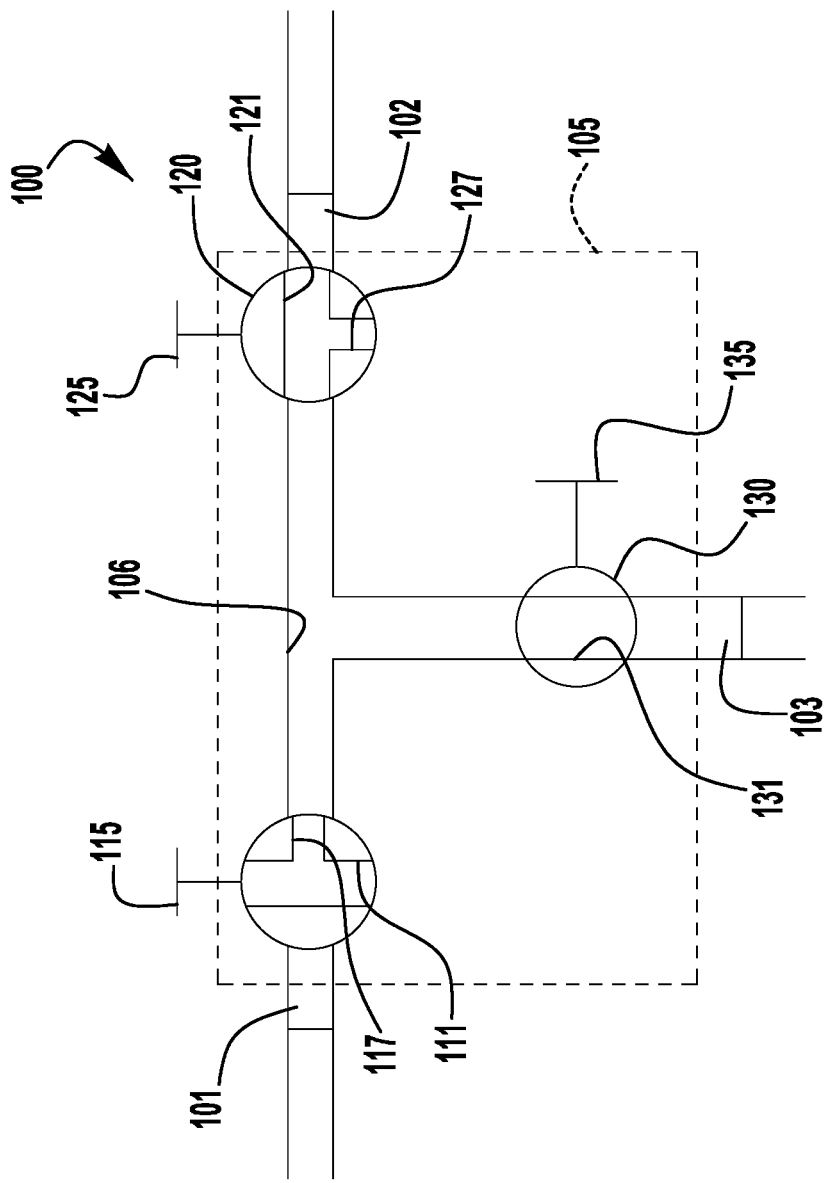
FIG. 1B is a schematic view of the three-valve assembly of FIG. 1A, shown in a closed, downstream vent configuration.
Figure 1C:
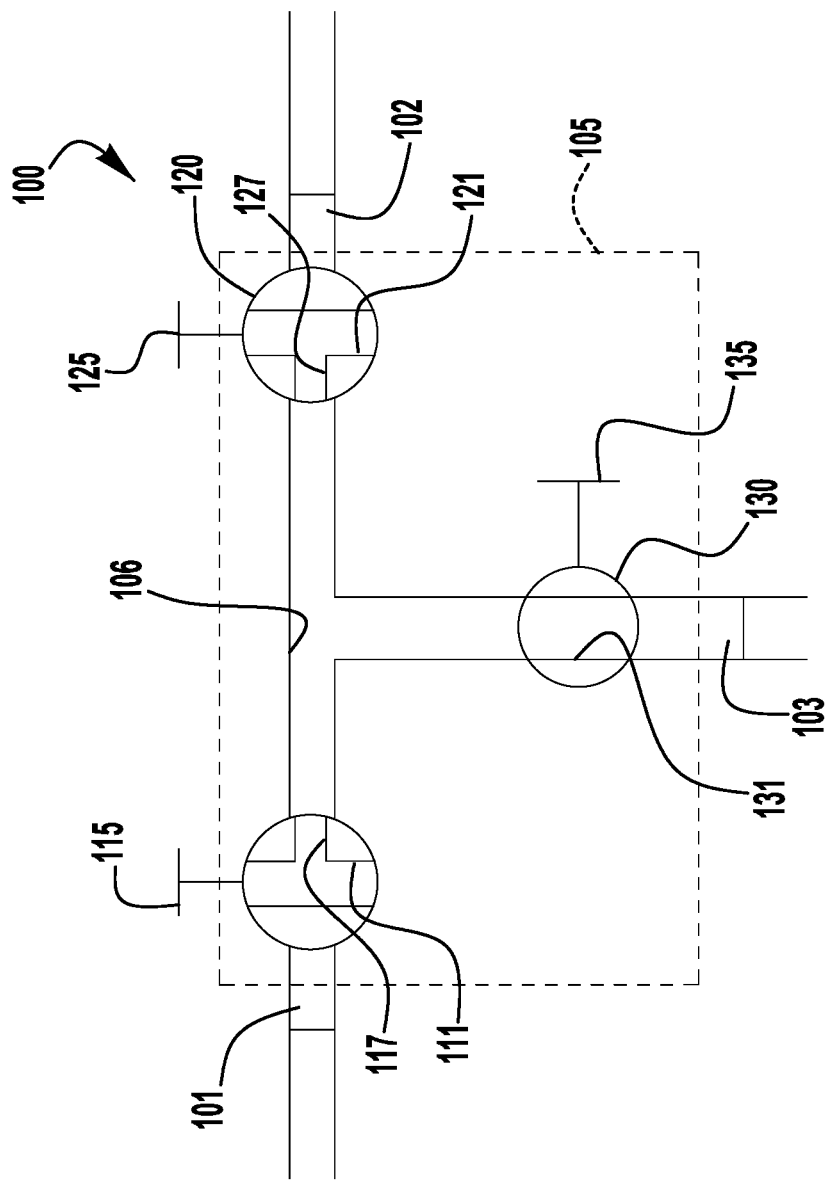
FIG. 1C is a top cross-sectional view of the three-valve assembly of FIG. 2, shown in a closed, internal bleed configuration.
Figure 2:
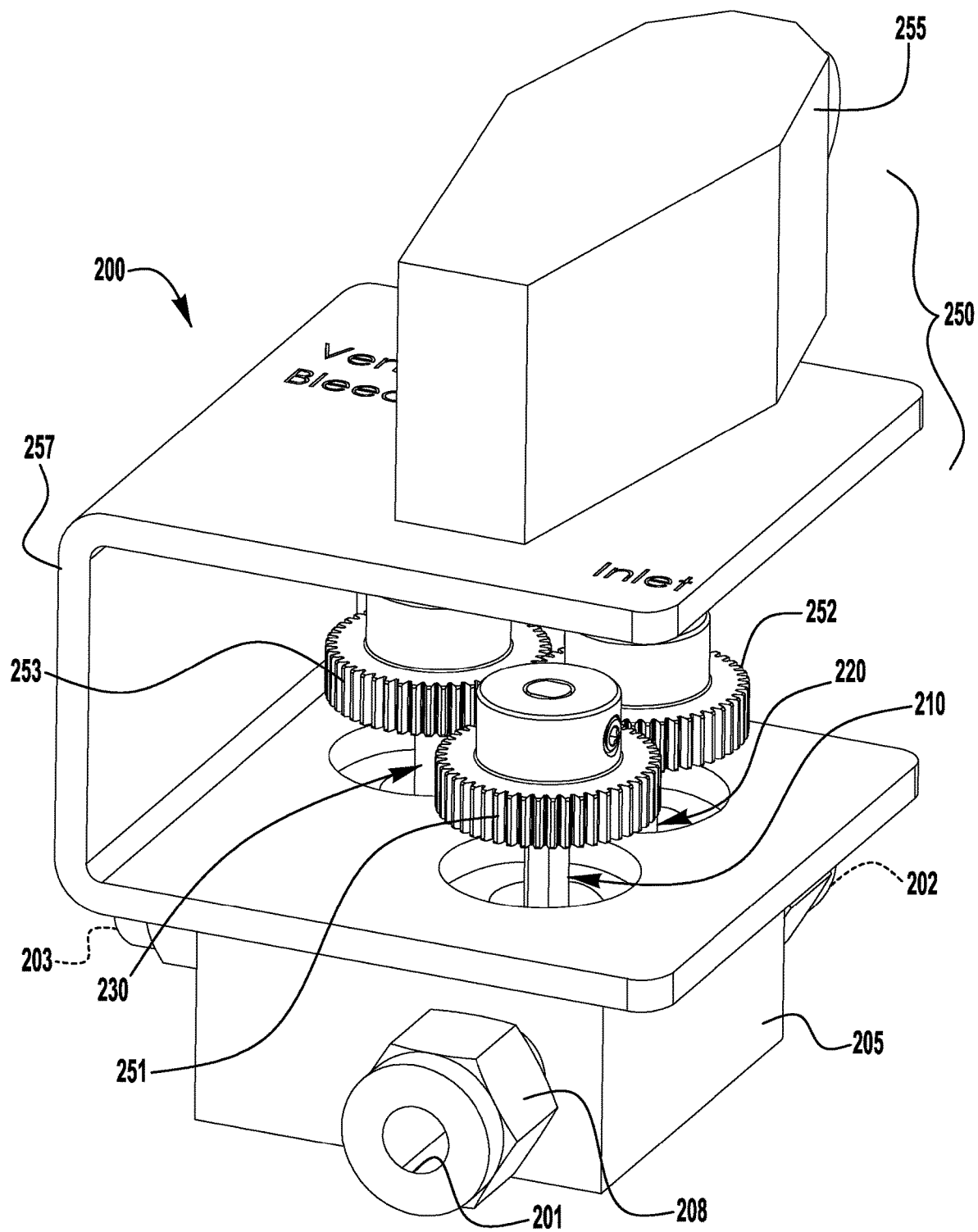
FIG. 2 is an upper perspective view of an exemplary three-valve double block and bleed assembly having a single actuator mechanism, according to an exemplary embodiment of the present disclosure.

A conventional double block and bleed ("DBB") valve arrangement 100, as schematically shown in FIGS. 1A-1C, includes a valve body 105 accommodating three independently actuated valve elements: upstream and downstream shutoff or block valve elements 110, 120 (e.g., ported ball or plug valve elements) in fluid communication with upstream and downstream end ports 101, 102 and spaced apart by an interior valve passage 106, and a vent or bleed valve element 130 (e.g., ported ball or plug valve element) in fluid communication with the interior passage 106 and a vent or bleed port 103 on the valve body 105. Each valve element 110, 120, 130 may be provided with a valve actuator (e.g., user rotatable handle) 115, 125, 135 operatively connected with (e.g., rotationally fixed with) the corresponding valve element for actuation of the valve elements between open and closed positions.

When the upstream and downstream block valve elements 110, 120 are in an open position (FIG. 1A), with upstream and downstream valve element passages 111, 121 in-line with the end ports 101, 102 and internal through passage 106, the bleed valve element 130 is to be maintained in the closed position for normal pressurized fluid flow through the system (e.g., from the upstream port 101 to the downstream port 102). When isolation of a downstream fluid system component is desired (e.g., for calibration, repair, and/or replacement), the upstream block valve element 110 may be closed (e.g., by rotating upstream valve actuator 115 to misalign the upstream valve element passage 111 with the upstream end port 101 and internal through passage 106) and the bleed valve element 130 opened (e.g., by rotating bleed valve actuator 135 to align vent valve passage 131 with vent port 103 and internal through passage 106) (FIG. 1B) to vent any accumulated downstream pressure through the downstream end port 102, downstream valve element passage 121, and internal through passage 106, and out the vent port 103. The downstream block valve element 120 may then be closed (e.g., by rotating downstream valve actuator 125 to misalign the downstream valve element passage 121 with the downstream end port 102 and internal through passage 106), with the bleed valve element 130 maintained in the open position (FIG. 1C), to fully bleed or de-energize the valve passage 106 while isolating the upstream and downstream fluid components. In some embodiments, the upstream and downstream valve elements 110, 120 may be provided with vent passages 117, 127 intersecting the valve element passages 111, 121 and in communication with the valve cavity 106 when the upstream and downstream valve elements are in the closed positions, to de-energize or depressurize the valve element passages 111, 121 when the valve elements are in the closed position.

Such procedures can provide for safe, double blocked and de-energized maintenance of the system, for example, to take the downstream system off-line (e.g., for typical transmitter calibration procedures). However, accidental deviations from valve actuation sequencing of such procedures (e.g., open bleed valve while upstream block valve is still open) can present the risk of fugitive emissions, user exposure to process media, or contamination or other damage to fluid system components.

According to an exemplary aspect of the present disclosure, a multi-valve arrangement (e.g., a double block and bleed valve arrangement, as described above) may be provided with a single valve actuator mechanism (e.g., single rotatable lever handle) configured to simultaneously operate two or more of the valve elements by operation of the single valve actuator, thereby providing for simple and safe actuation of the multiple valve elements. The single valve actuator mechanism may be configured to prevent undesirable valve element position combinations (e.g., upstream block valve element and bleed valve element open at the same time). Many different types of single valve actuator mechanism may be utilized. In an exemplary embodiment, an actuator mechanism includes a gear arrangement to transmit rotation of the single actuator (e.g., rotatable valve handle) to at least one of the multiple valve elements.

Figure 3:
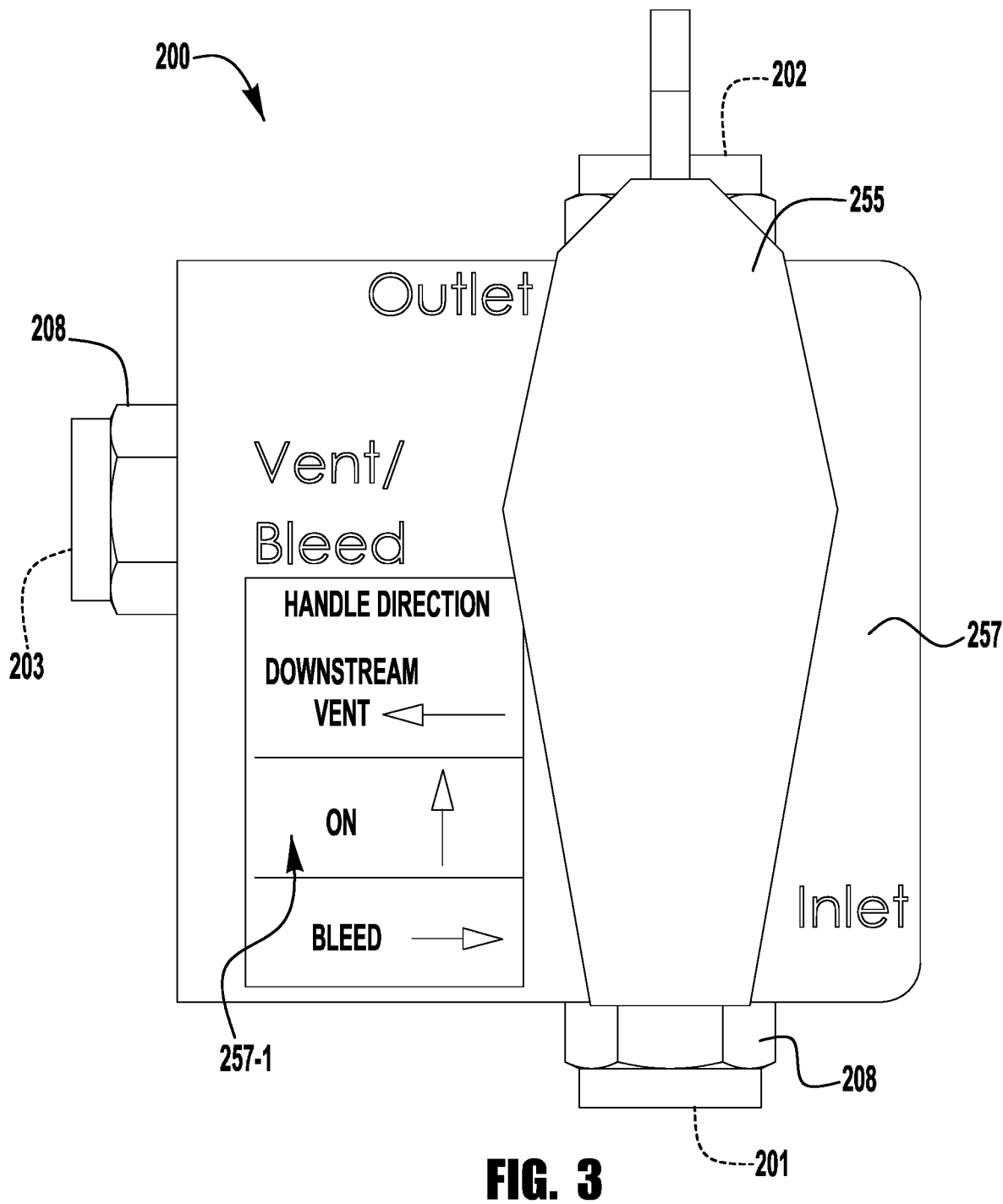
FIG. 3 is a top view of the three-valve assembly of FIG. 2.
Figure 4:
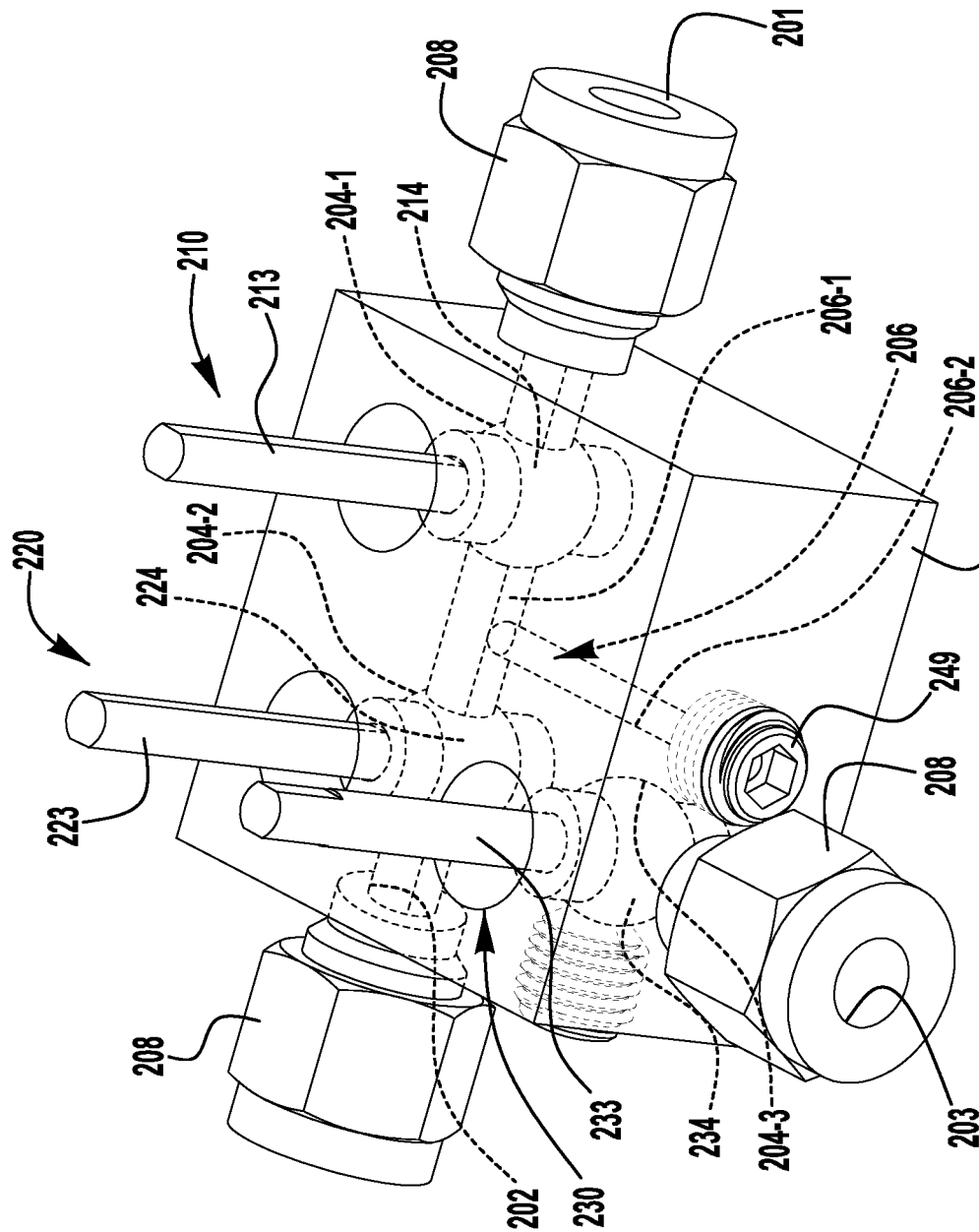
FIG. 4 is an upper perspective view of the three-valve assembly of FIG. 2, shown with the actuator handle, mounting bracket, and gears removed, and with the valve body in phantom, to illustrate additional features of the assembly.

FIGS. 2-5C illustrate various views of an exemplary three-valve (e.g., double block and bleed) assembly 200 including a single valve actuator mechanism 250 operatively connected with first (upstream), second (downstream), and third (bleed) valve elements 210, 220, 230 assembled with a valve body 205 to control flow between a first (upstream) end port 201, a second (downstream) end port 202, and a third (vent) port 203 of the valve body, which may include attached (e.g., welded) end connections 208, such as tube fittings, as shown. While many different types of valve elements may be utilized, in the illustrated embodiment, as best shown in FIG. 4, the valve elements 210, 220, 230 include lower ported ball portions 214, 224, 234 sealed within corresponding cavities 204-1, 204-2, 204-3 in the valve body 205 (e.g., by plastic seats or packing, not shown) and upper stem portions 213, 223, 233 that extend from the valve cavities for connection with the valve actuator mechanism 250. In the illustrated embodiment, the valve body 205 includes an internal through passage 206 extending between the upstream valve element 210, the downstream valve element 220, and the bleed valve element 230, and an internal vent passage 207 (FIGS. 5A-5C) extending between the downstream valve element and the bleed valve element. The illustrated internal through passage 206 includes a first portion or first leg 206-1 extending between the upstream and downstream valve elements 210, 220 and a second portion or second leg 206-2 extending from the first leg to the bleed valve element 230. As shown, the second leg 206-2 may be formed by drilling from the outer surfaces of the valve body 205, with plugs 249 (e.g., threaded, as shown, or welded) defining limits of the second leg.

In the illustrated example, the single valve actuator mechanism 250 includes a valve handle 255 rotationally fixed with the downstream valve element 220 (e.g., secured by a set screw to the upper stem portion 223), and first, second, and third interlocking gears 251, 252, 253 rotationally fixed with each of the upstream, downstream, and bleed valve elements 210, 220, 230, for operative connection between the valve handle 255 and the upstream and bleed valve elements 210, 230. In other embodiments, the valve handle may be rotationally fixed with the upstream valve element, with the bleed valve element, or with none of the valve elements (e.g., operatively connected with all of the valve elements by an interlocking gear arrangements).

In the illustrated interlocking gear arrangement, rotation of the valve handle 255 and the second gear 252 (and downstream valve element 220) in a first (e.g., clockwise) direction drives rotation of the first and third gears 251, 253 (and upstream and bleed valve elements 210, 230) in an opposite second (e.g., counterclockwise) direction. In other embodiments, different interlocking gear arrangements may be used.

Figure 5A:
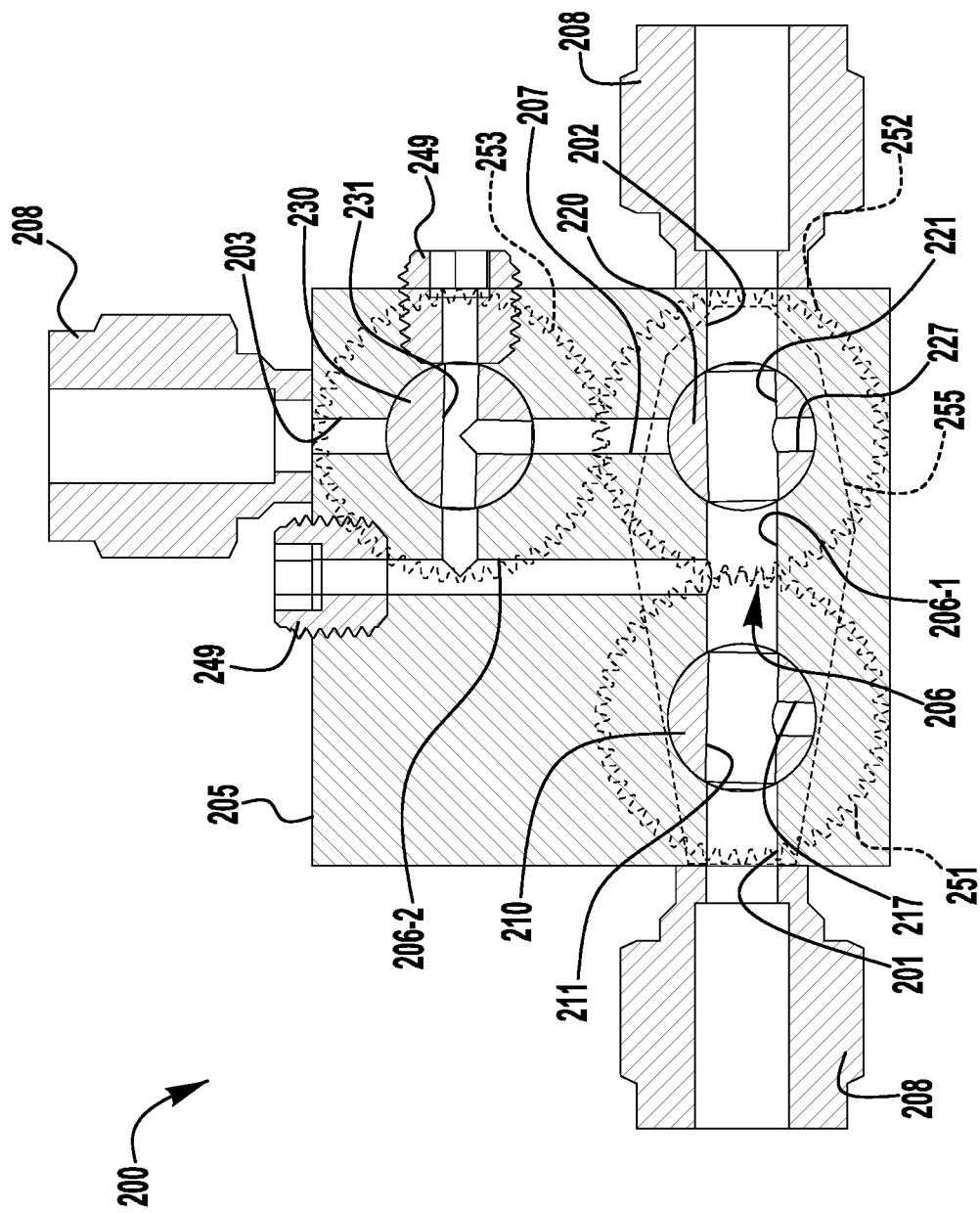
FIG. 5A is a top cross-sectional view of the three-valve assembly of FIG. 2, shown in an open or "on" configuration.

FIG. 5A illustrates the exemplary assembly 200 in a first ("on") configuration, in which the upstream and downstream valve elements 210, 220 are each in an open position, with the upstream and downstream valve element passages 211, 221 aligned with the upstream and downstream end ports 201, 202 and the internal through passage first leg 206-1, and the bleed valve element 230 is in a closed position, with the bleed valve element passage 231 misaligned with the vent port 203 to block flow between the internal through passage second leg 206-2 and the vent port 203.

Figure 5B:
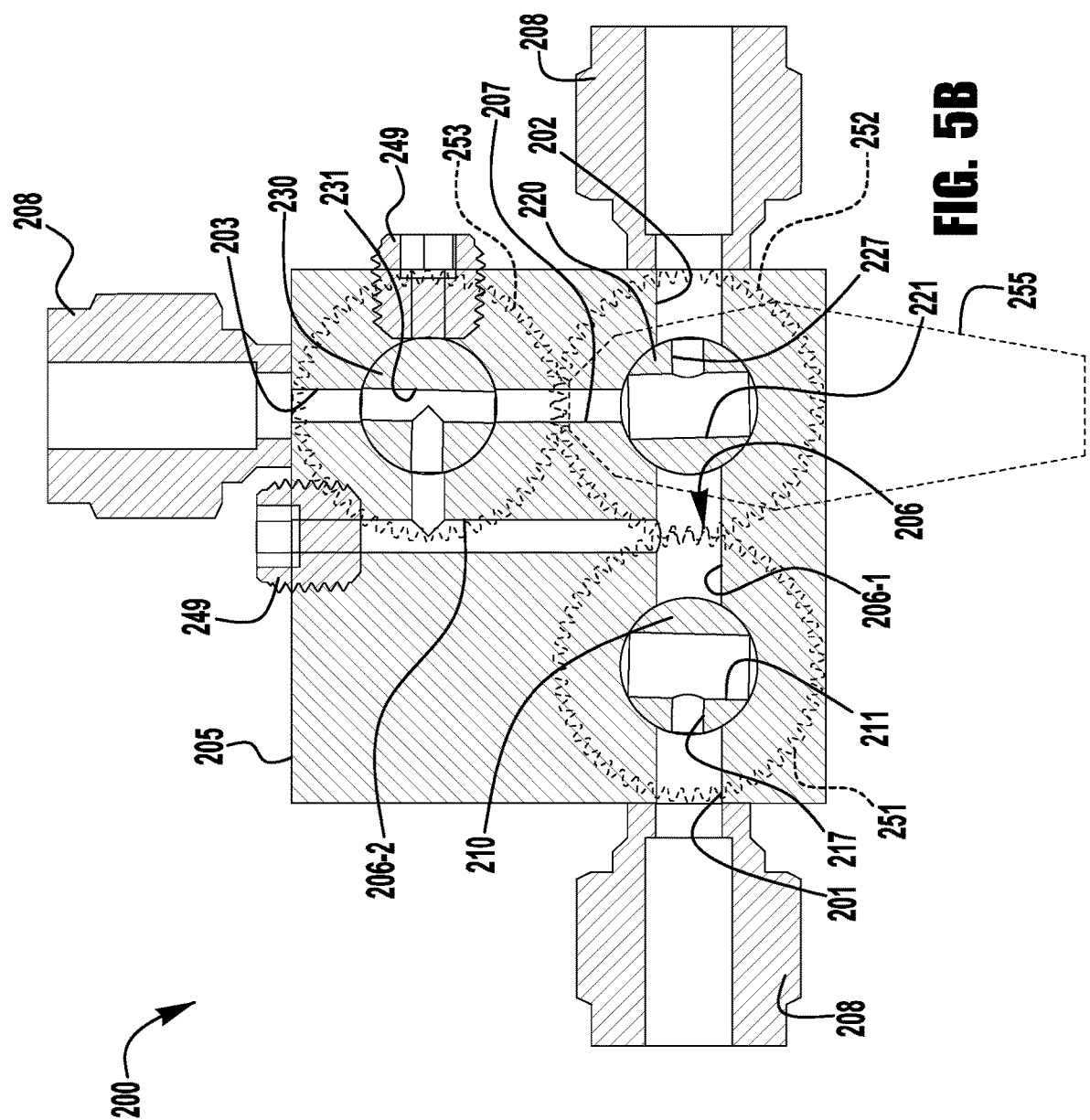
FIG. 5B is a top cross-sectional view of the three-valve assembly of FIG. 2, shown in a closed, downstream vent configuration.

FIG. 5B illustrates the exemplary assembly 200 in a second ("downstream vent") configuration, in which the upstream valve element 210 is in a closed position, the downstream valve element 220 is in a vented closed position, and the bleed valve element 230 is in a downstream vent position. To adjust the exemplary assembly 200 to the downstream vent configuration, the valve handle 255 is rotated a quarter-turn (90°) counterclockwise from the "on" configuration, such that the rotationally fixed second gear 252 and downstream valve element 220 are rotated a quarter-turn counterclockwise, and the first and third gears 251, 253 and upstream and bleed valve elements 210, 230 are rotated a quarter-turn clockwise. As shown, the upstream valve element passage 211 is misaligned with the internal through passage first leg 206-1 to shut off upstream fluid flow to the internal through passage 206. The downstream valve element passage 221 is aligned with the internal vent passage 207 and the downstream vent passage 227 is aligned with the downstream port 202, and the bleed valve element passage 231 is aligned with each of the internal through passage second leg 206-2, the internal vent passage 207, and the vent port 203, to permit flow of pressurized fluid from the internal through passage 206 and downstream port 202 to the vent port 203.

Figure 5C:
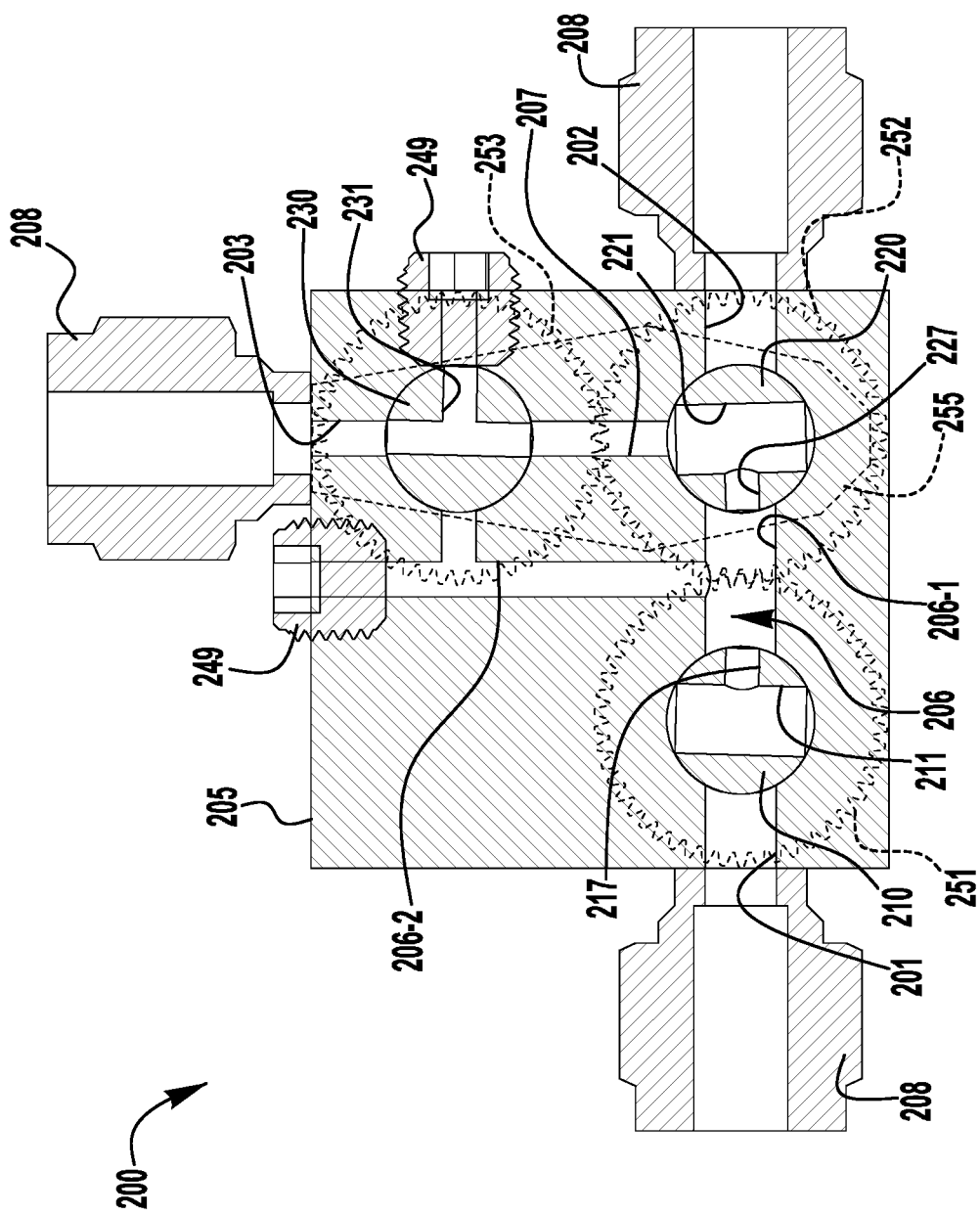
FIG. 5C is a top cross-sectional view of the three-valve assembly of FIG. 2, shown in a closed, internal bleed configuration.

FIG. 5C illustrates the exemplary assembly 200 in a third ("bleed") configuration, in which the upstream and downstream valve elements 210, 220 are each in an internally vented closed position, and the bleed valve element 230 is in an internal vent position. To adjust the assembly to the "bleed" configuration, the valve handle 255 is rotated a quarter-turn (90°) clockwise from the "on" configuration, such that the rotationally fixed second gear 252 and downstream valve element 220 are rotated a quarter-turn clockwise, and the first and third gears 251, 253 and upstream and bleed valve elements 210, 230 are rotated a quarter-turn counterclockwise. As shown, the upstream and downstream valve element passages 211, 221 are misaligned with the upstream and downstream end ports 201, 202 to shut off upstream and downstream fluid flow to the internal through passage 206, the downstream valve element passage 221 is aligned with the internal vent passage 207, and the upstream and downstream vent passages 217, 227 are aligned with the internal through passage first leg 206-1. The bleed valve element passage 231 is aligned with each of the internal vent passage 207 and the vent port 203 to permit flow of pressurized fluid from the internal through passage 206 and the upstream and downstream valve element passages 211, 221 to the vent port.

As shown in FIG. 3, the assembly may be provided with a bracket, plate or other structure 257 carrying indicia 257' for identifying the valve conditions corresponding to each handle position.

In some applications, it may be desirable to limit actuation of the valve assembly 200 to one of the two vent/bleed configurations. In such an arrangement, a stop pin or other stop structure may be installed (for example, in an aperture in the bracket 257) to prevent movement of the handle from one of the downstream vent and bleed positions. In other embodiments, additionally or alternatively, the valve handle 255 may be a "latch-lock" style handle having a mechanism for securing the handle against inadvertent or unauthorized actuation to a different valve configuration (e.g., by securing a padlock shackle through a release latch of the latch lock mechanism).

In other applications, it may be desirable to cycle the valve assembly from the "on" configuration to the "downstream vent" configuration, and then from the "downstream vent" configuration to the "bleed" configuration, consistent with the use of the valve assembly 100 of FIGS. 1A-1C, as described above. In some embodiments, such as, for example, the embodiment of FIGS. 5A-5C, adjustment of the valve assembly 200 from the "downstream vent" configuration to the "bleed" configuration could require that the valve assembly pass through the "on" configuration, which may result in re-introduction of pressurized fluid from the upstream port 201 into the internal through passage 206. According to another aspect of the present disclosure, a valve assembly may be configured to maintain the upstream valve element in a closed position when the downstream valve element is moved from the downstream vented closed position to the internally vented closed position, to eliminate this intermediary "on" configuration. In an exemplary embodiment, the second, downstream valve element may be operatively connected with the first, upstream valve element between the "on" configuration and the "downstream vent" configuration, and operatively disconnected from the upstream valve element between the "downstream vent" configuration and the "bleed" configuration.

According to an exemplary aspect of the present disclosure, an actuator mechanism may be configured to allow for operative disengagement of the valve actuator (e.g., handle) from the upstream valve element when the valve handle is rotated beyond the downstream vent position toward the internal bleed position, thereby maintaining the upstream valve element in the closed position while the downstream valve element is rotated through the open position to the internal bleed position.

Figure 6A:
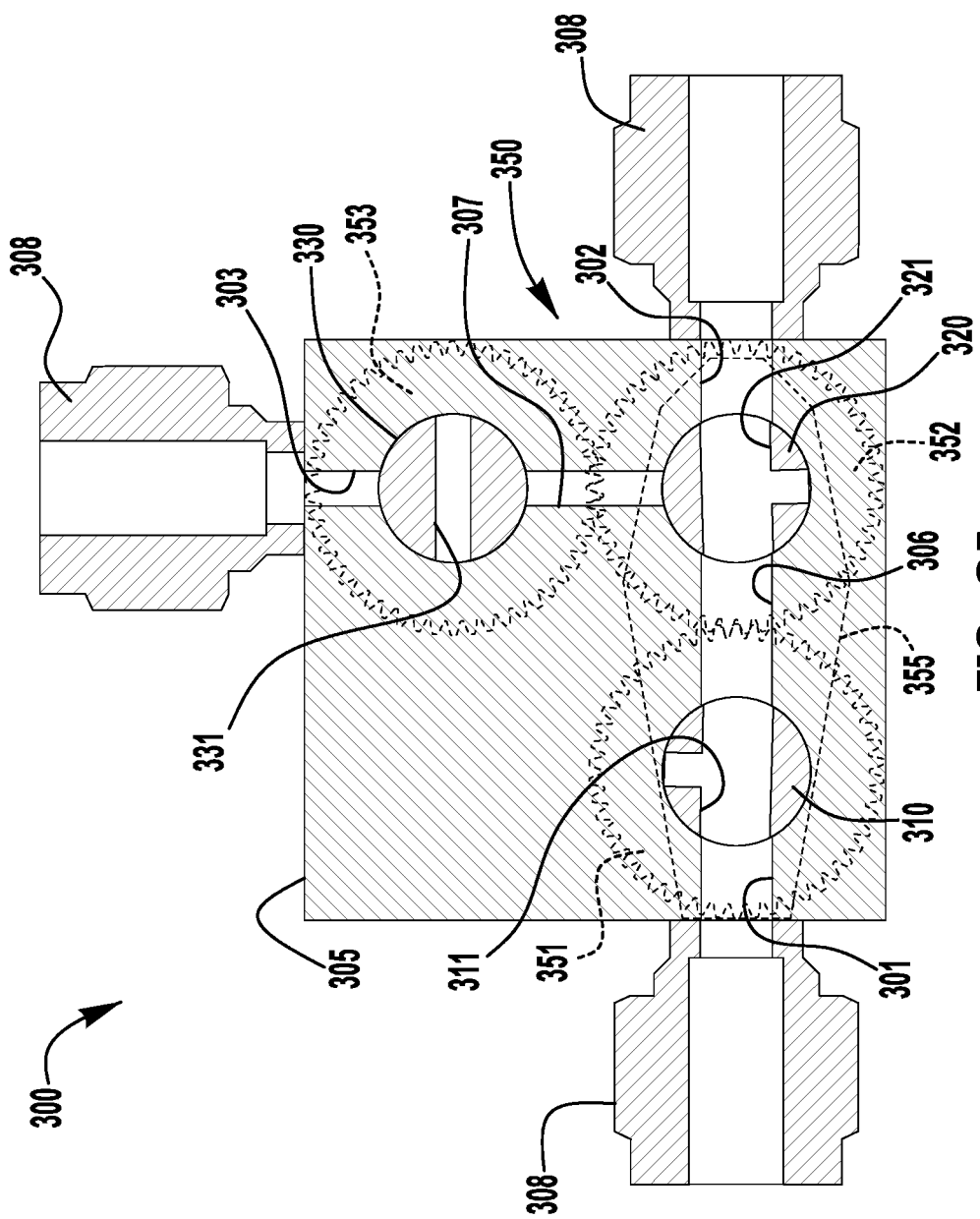
FIG. 6A is a top cross-sectional view of an exemplary three-valve double block and bleed assembly having a single actuator mechanism, according to another exemplary embodiment of the present disclosure, with the three-valve assembly shown in an open or "on" configuration.
Figure 6B:
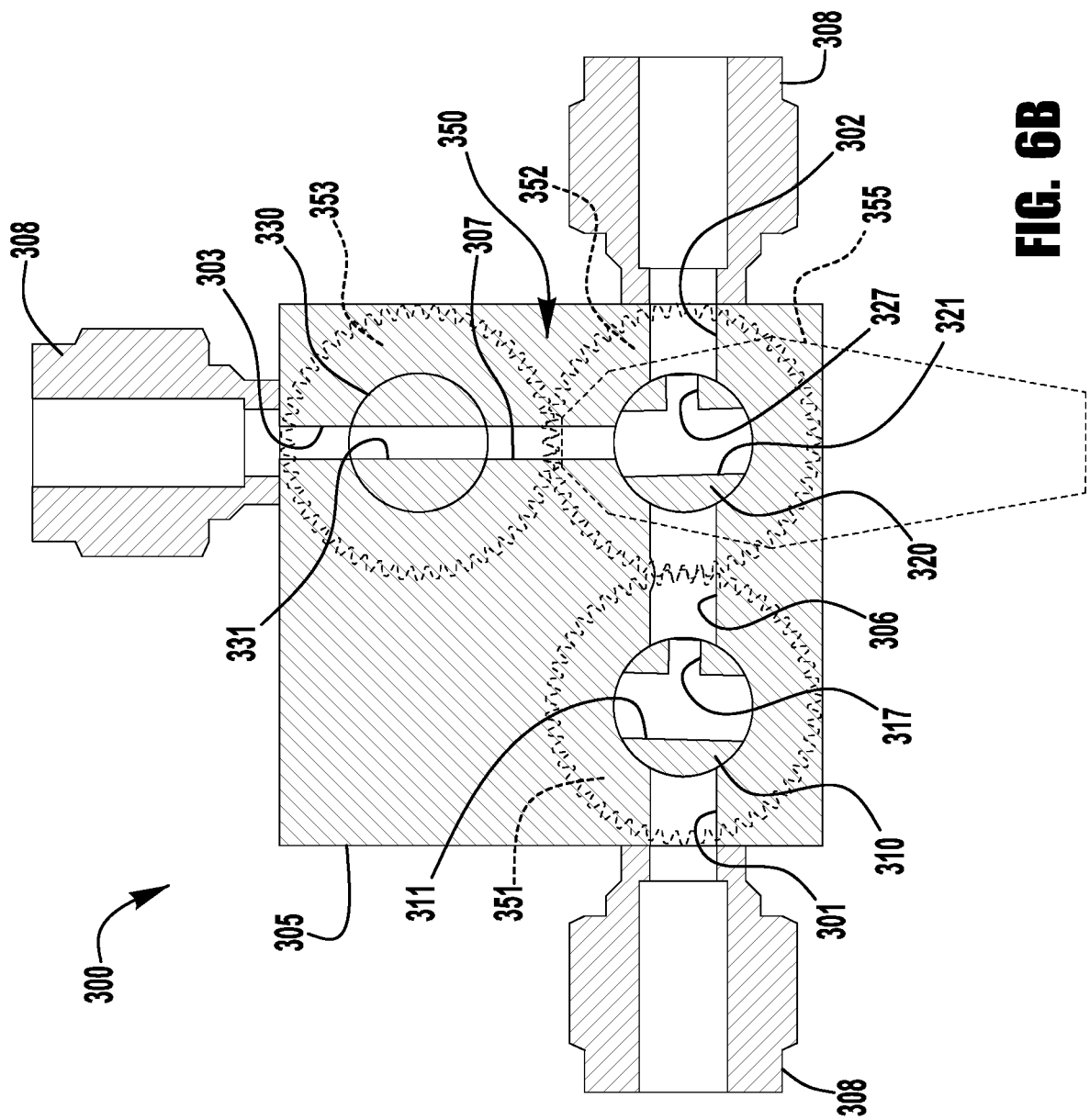
FIG. 6B is a top cross-sectional view of the three-valve assembly of FIG. 6A, shown in a closed, downstream vent configuration.
Figure 6C:
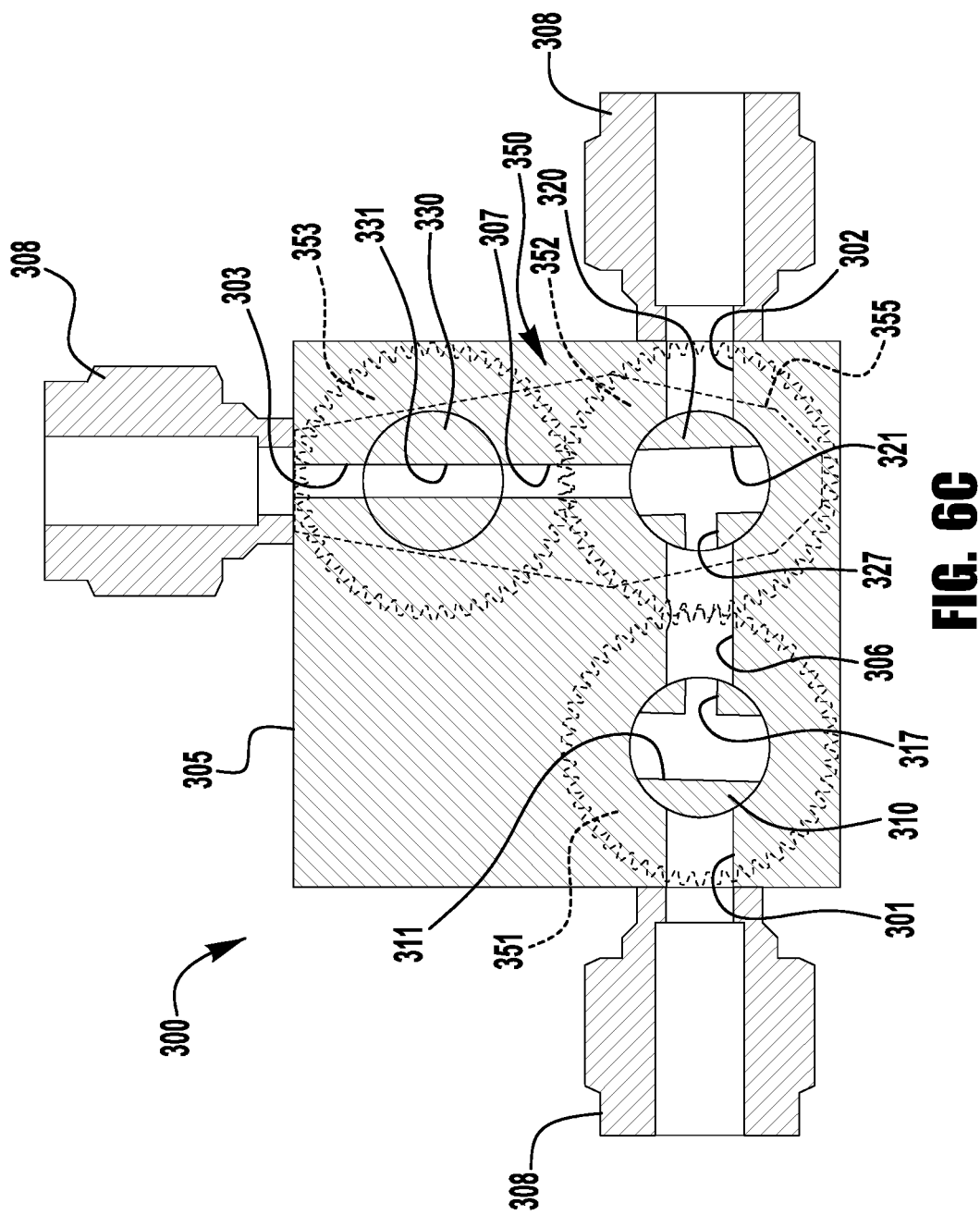
FIG. 6C is a top cross-sectional view of the three-valve assembly of FIG. 6A, shown in a closed, internal bleed configuration.

FIGS. 6A-6C illustrate an exemplary three-valve (e.g., double block and bleed) assembly 300 similar to the assembly of FIGS. 2-5C, including a single valve actuator mechanism operatively connected with first (upstream), second (downstream), and third (bleed) valve elements 310, 320, 330 (e.g., with ported ball and upper stem portions, as described above) assembled with a valve body 305 to control flow between a first (upstream) end port 301, a second (downstream) end port 302, and a third (vent) port 303 of the valve body, which may include attached (e.g., welded) end connections 308, such as tube fittings, as shown. In the illustrated embodiment, the valve body 305 includes an internal through passage 306 extending between the upstream valve element 310 and the downstream valve element 320, and an internal vent passage 307 extending between the downstream valve element and the bleed valve element 330.

In the illustrated example, the single valve actuator mechanism includes a valve handle 355 rotationally fixed with the downstream valve element 320, and first, second, and third interlocking gears 351, 352, 353 rotationally fixed with each of the upstream, downstream, and bleed valve elements 310, 320, 330, for operative connection between the valve handle 355 and the upstream and bleed valve elements 310, 330. In other embodiments, the valve handle may be rotationally fixed with the upstream valve element, with the bleed valve element, or with none of the valve elements (e.g., operatively connected with all of the valve elements by an interlocking gear arrangements).

FIG. 6A illustrates the exemplary assembly 300 in a first (open or "on") configuration, in which the upstream and downstream valve elements 310, 320 are each in an open position, and the bleed valve element 330 is in a closed position. As shown, the upstream and downstream valve element passages 311, 321 are aligned with the upstream and downstream end ports 301, 302 and the internal through passage 306, and the bleed valve element passage 331 is misaligned with the vent port 303 and the internal vent passage 307 to block flow between the downstream valve element passage 321 and the vent port 303.

In the illustrated interlocking gear arrangement, rotation of the valve handle 355 and the second gear 352 (and downstream valve element 320) a quarter turn (90°) in a first, counterclockwise direction from the "on" position to the "downstream vent" position drives rotation of the first and third gears 351, 353 a quarter turn (90°) in an opposite second, clockwise direction to rotate the upstream and bleed valve elements 310, 330 to their downstream vent positions.

FIG. 6B illustrates the exemplary assembly 300 in a second ("downstream vent") configuration, in which the upstream valve element 310 is in a closed position, the downstream valve element 320 is in a vented closed position, and the bleed valve element 330 is in an open position. As shown, the upstream valve element passage 311 is misaligned with the inlet port 301 to shut off upstream fluid flow to the internal through passage 306. The downstream valve element passage 321 is aligned with the internal vent passage 307 and the downstream vent passage 327 is aligned with the downstream port 302. The bleed valve element passage 331 is aligned with each of the internal vent passage 307 and the vent port 303 to permit flow of pressurized fluid from the internal through passage 306 and downstream port 302 to the vent port 303.

In the illustrated embodiment, the actuator mechanism 350 is configured to allow for operative disengagement of the upstream valve element 310 from the valve handle 355 when the valve handle is rotated beyond the downstream vent position toward the internal bleed position, thereby maintaining the upstream valve element in the closed position while the downstream valve element 320 is rotated through the open position to the internal bleed position. To adjust the assembly to the "bleed" configuration, the valve handle 355 is rotated a half-turn (180°) counterclockwise from the "downstream vent" configuration (i.e., from the 90° position to the 270° position), such that the rotationally fixed downstream valve element 320 is rotated a half-turn counterclockwise, and the upstream valve element remains in the downstream vent position, disengaged from the valve handle.

Figure 7A:
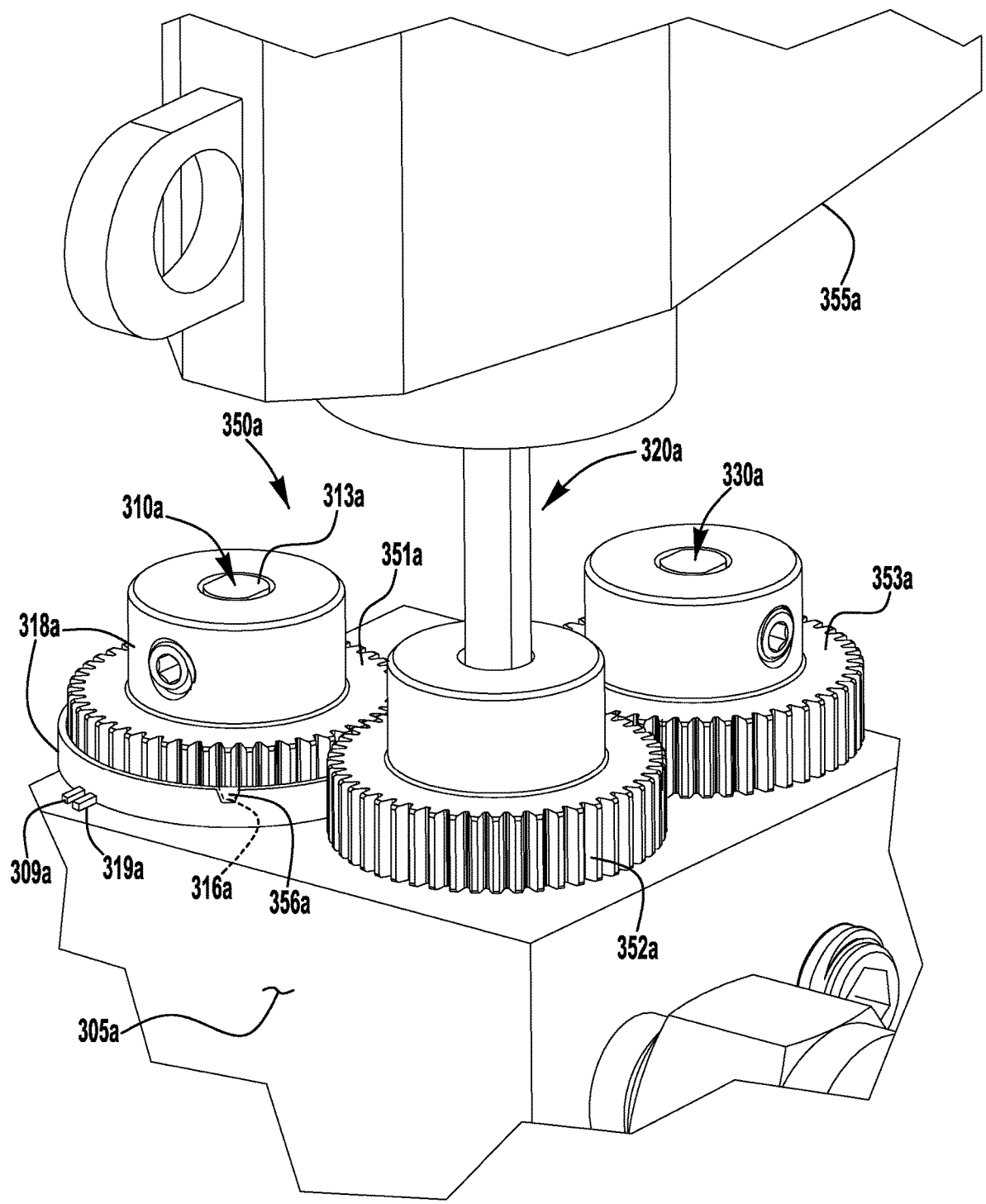
FIG. 7A is a schematic view of an exemplary single actuator mechanism providing for operative disengagement of the upstream valve element from the valve actuator, according to an exemplary embodiment of the present disclosure.

Many different mechanisms may be utilized for operatively disengaging the upstream valve element from the valve actuator when the valve actuator is rotated beyond the downstream vent position toward the internal bleed position. As one example, as shown in FIG. 7A, an actuator mechanism 350a may include an upstream valve element 310a having a stop member 319a (e.g., on collar 318a secured to valve stem 313a) preventing rotation of the upstream valve element beyond the downstream vent position (e.g., by engaging a corresponding stop portion 309a on the valve body 305a), and a first detent feature 316a that is disengageable from a second detent feature 356a on the first gear 351a to permit continued rotation of the first gear 351a when the valve handle 355a and the second gear 352a are rotated beyond the downstream vent position toward the internal bleed position. When the valve handle 355a is rotated a half-turn counterclockwise from the "downstream vent" configuration (i.e., from the 90° position to the 270° position) to the "bleed" configuration, the second gear 352a and downstream valve element 320a are rotated a half-turn counterclockwise, the first and third gears 351a, 353a and bleed valve element 330a are rotated a half turn clockwise, and the upstream valve element 310a remains in the downstream vent position, disengaged from the first gear 351a. When the first gear 351a is returned (180° counterclockwise) to the downstream vent position (as driven by clockwise rotation the valve handle 355a and second gear 352a), the first and second detent features 316a, 356a re-engage (e.g., by a spring-loaded mechanism) to allow for co-rotation of the first gear 351a and upstream valve element 310a from the downstream vent position back to the "on" position.

Figure 7B:
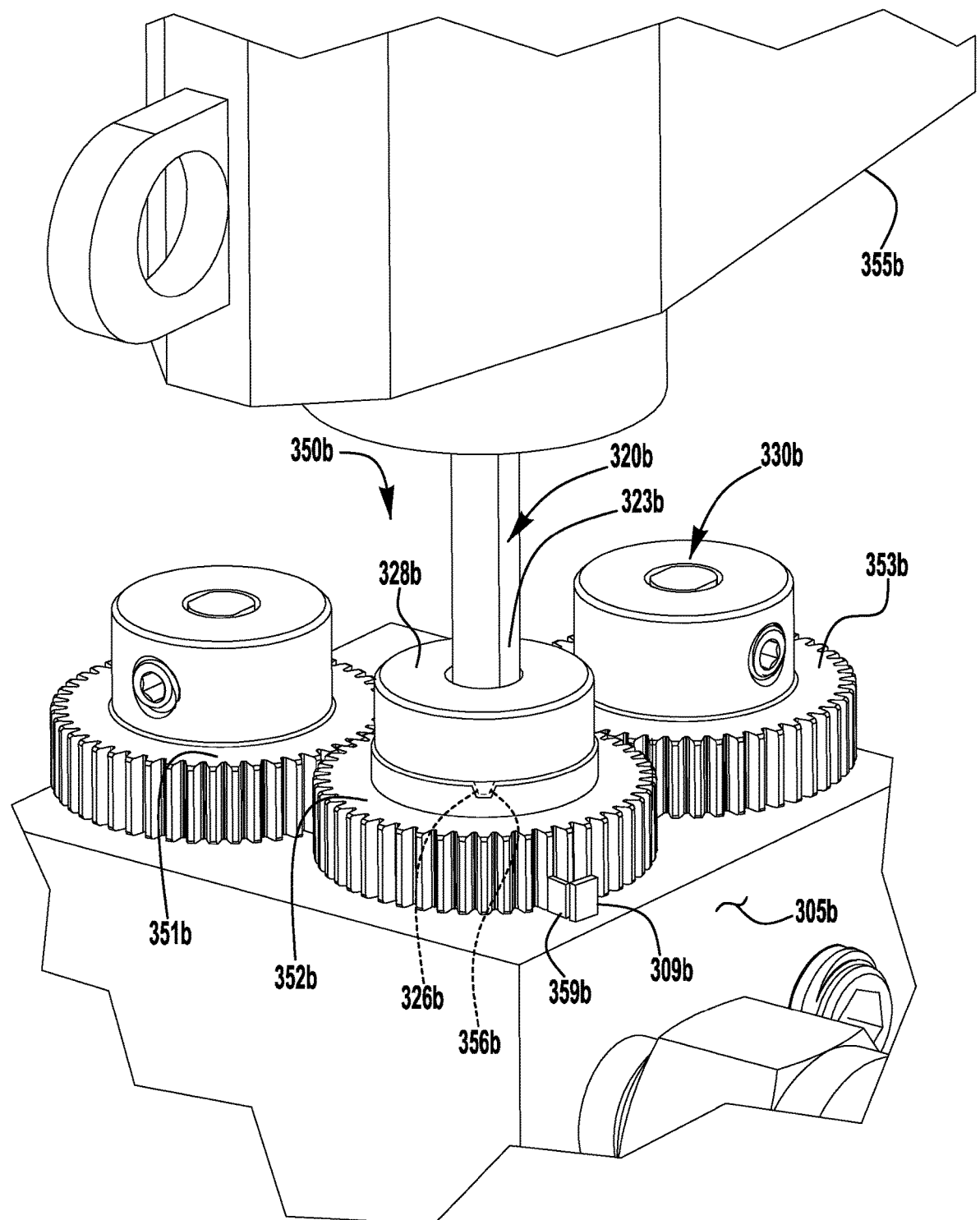
FIG. 7B is a schematic view of an exemplary single actuator mechanism providing for operative disengagement of the upstream and bleed valve elements from the valve actuator, according to another exemplary embodiment of the present disclosure.
Figure 9:
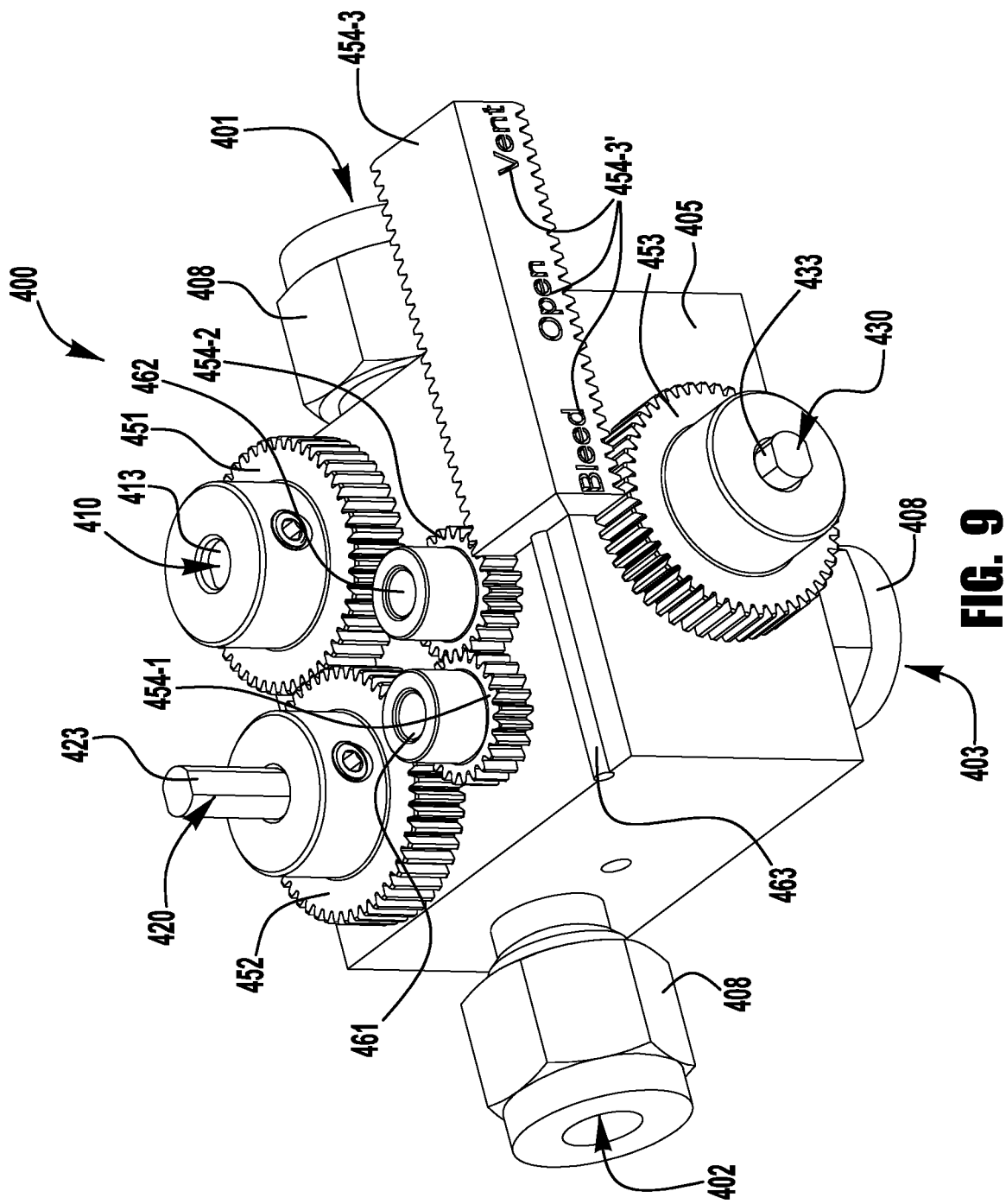
FIG. 9 is a top view of the three-valve assembly of FIG. 8, shown with the actuator handle and casing cover removed to illustrate additional features of the assembly.

In another embodiment, as schematically shown in FIG. 7B, an actuator mechanism 350b may include a second gear 352b having a stop member 359b preventing rotation of the downstream valve element beyond the downstream vent position (e.g., by engaging a corresponding stop portion 309b on the valve body 305b). The downstream valve element 320b includes a first detent feature 326b (e.g., carried by collar 328b secured to valve stem 323b) that is disengageable from a second detent feature 356b on the second gear 352b to permit continued rotation of the valve handle 355b and downstream valve element 320b beyond the downstream vent position toward the internal bleed position. When the valve handle 355b and downstream valve element 320b are rotated a half-turn counterclockwise from the "downstream vent" configuration (i.e., from the 90° position to the 270° position) to the "bleed" configuration, the downstream valve element disengages from the second gear and the first, second, and third gears 351b, 352b, 353b and the upstream valve and bleed valve elements 310b, 330b remain in the downstream vent position, disengaged from the valve handle 355b. When the valve handle 355b and downstream valve element 320b are returned (180° clockwise) to the downstream vent position, the first and second detent features 326b, 356b re-engage (e.g., by a spring-loaded mechanism) to allow for co-rotation of the second gear 352b and downstream valve element 320b, the first gear 351b and upstream valve element 310b, and the third gear 353b and bleed valve element 330b from the downstream vent position back to the "on" position.

FIG. 6C illustrates the exemplary assembly 300 in the bleed configuration, in which the upstream and downstream valve elements 310, 320 are each in an internally vented closed position, and the bleed valve element 330 is in an open position. As shown, with the upstream valve element 310 in the same "downstream vent" orientation, the upstream valve element passage 311 remains misaligned with the inlet port 301 to shut off upstream fluid flow to the internal through passage 306 (as with the downstream vent configuration), and the upstream vent passage 317 is aligned with the internal through passage 306. The downstream valve element passage 321 is aligned with the internal vent passage 307 and the downstream vent passage 327 is aligned with the internal through passage 306. With the bleed valve element 330 in the same "downstream vent" orientation (as with the mechanism of FIG. 7B) or rotated 180° from the "downstream vent" orientation (as with the mechanism of FIG. 7A), the bleed valve element passage 331 is aligned with each of the internal vent passage 307 and the vent port 303 to permit flow of pressurized fluid from the internal through passage 306 and upstream and downstream valve element passages 311, 321 to the vent port 303.

Other gearing arrangement may be utilized. For example, a gearing arrangement may provide for two or more valve elements rotatable about non-parallel (e.g., perpendicular) axes, for example, to provide for a compact assembly having two or more ports extending in different (e.g., non-parallel) directions.

Figure 10:
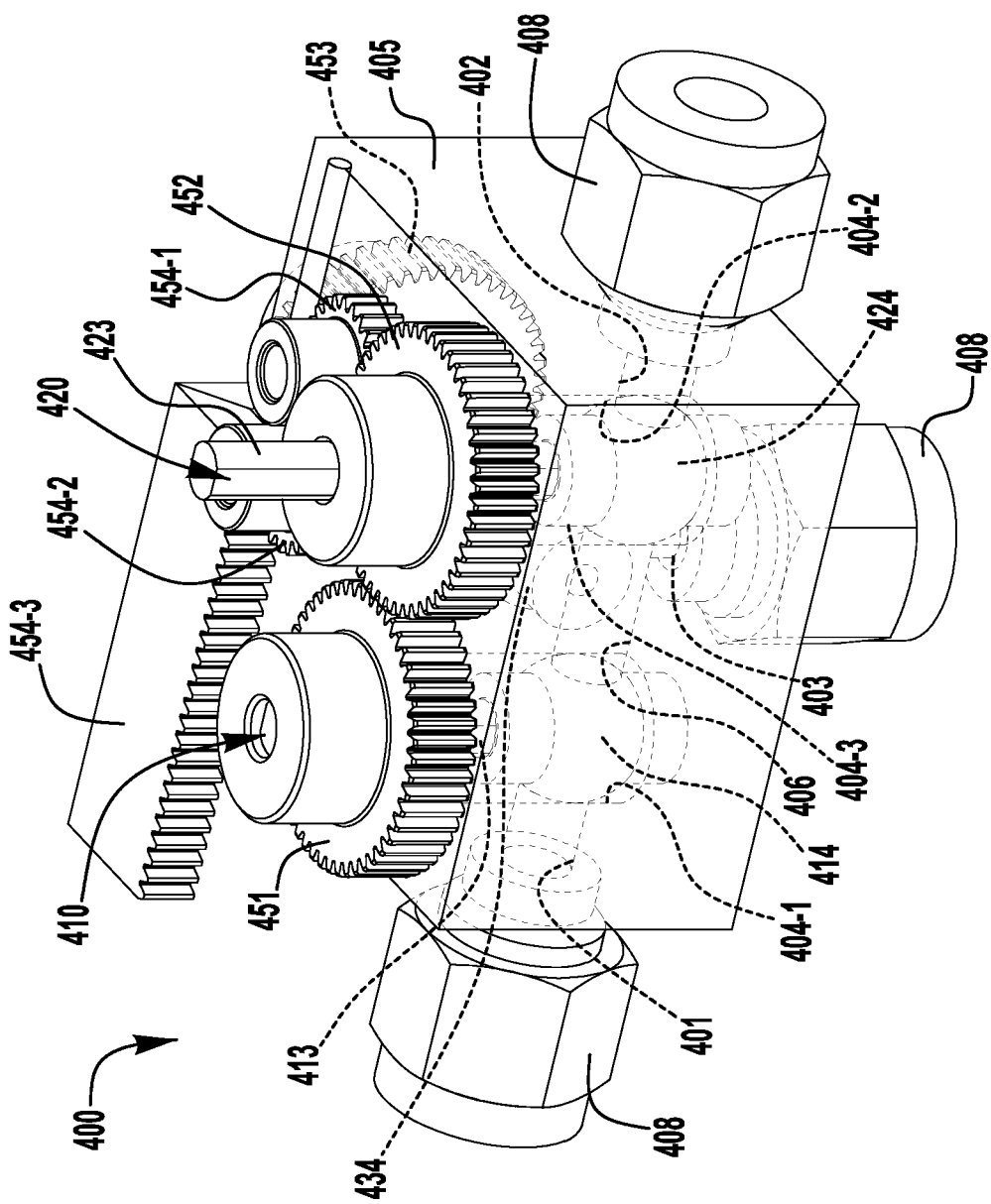
FIG. 10 is an upper rear perspective view of the three-valve assembly of FIG. 8, shown with the actuator handle and casing removed and with the valve body in phantom to illustrate additional features of the assembly.

FIGS. 8-12C illustrate various views of an exemplary three-valve (e.g., double block and bleed) assembly 400 including a single valve actuator mechanism 450 operatively connected with vertically oriented first (upstream) and second (downstream) valve elements 410, 420, and a horizontally oriented third (bleed) valve element 430, assembled with a valve body 405 to control flow between horizontal first (upstream) and second (downstream) end ports 401, 402 and a vertical third (vent) port 403 of the valve body, each of which may include attached (e.g., welded) end connections 408, such as tube fittings, as shown. The illustrated assembly 400 includes an outer casing 460 surrounding the valve body 405 and portions of the actuator mechanism 450, for example, to protect the mechanism gears from damage or contamination. While many different types of valve elements may be utilized, in the illustrated embodiment, as best shown in FIGS. 10, 11A, and 11B, the valve elements 410, 420, 430 include lower ported ball portions 414, 424, 434 sealed within corresponding cavities 404-1, 404-2, 404-3 in the valve body 405 (e.g., by plastic seats or packing, not shown) and upper stem portions 413, 423, 433 that extend from the valve cavities for connection with the valve actuator mechanism 450. In the illustrated embodiment, the valve body 405 includes an internal through passage 406 extending between the upstream valve element 410, the downstream valve element 420, and the bleed valve element 430, and an internal vent passage 407 extending between the downstream valve element and the bleed valve element. As shown, the vent passage 407 may be formed by drilling from the outer surfaces of the valve body 405, with plugs 449 (e.g., threaded or welded) defining limits of the vent passage.

In the illustrated example, the single valve actuator mechanism 450 includes a valve handle 455 rotationally fixed with the downstream valve element 420 (e.g., secured by a set screw to the upper stem portion 423), and first, second, and third interlocking gears 451, 452, 453 rotationally fixed with each of the upstream, downstream, and bleed valve elements 410, 420, 430, for operative connection between the valve handle 455 and the upstream and bleed valve elements 410, 430. One or more intermediary gears may be used to drive rotational movement of the third gear 453 and bleed valve element 430 about a horizontal axis. In the illustrated embodiment, the second gear 452 is operatively connected with the third gear 453 by first and second spur gears 454-1, 454-2 (e.g., rotatable on gear pins 461, 462 assembled with the valve body 405), and a rack gear 454-3 having horizontal teeth meshing with the second spur gear, and vertical teeth meshing with the third gear, the rack gear being horizontally slidable (e.g., on a guide pin 463 secured with the valve body 405) to translate vertical axis rotation of the second spur gear to horizontal axis rotation of the third gear 453.

In the illustrated interlocking gear arrangement, rotation of the valve handle 455 and the second gear 452 (and downstream valve element 420) in a first (e.g., clockwise) direction drives rotation of the first and third gears 451, 453 (and upstream and bleed valve elements 410, 430) in an opposite second (e.g., counterclockwise) direction. In other embodiments, different interlocking gear arrangements may be used. For example, the valve handle may be rotationally fixed with the upstream valve element, with the bleed valve element, or with none of the valve elements (e.g., operatively connected with all of the valve elements by an interlocking gear arrangements).

Figure 11A:
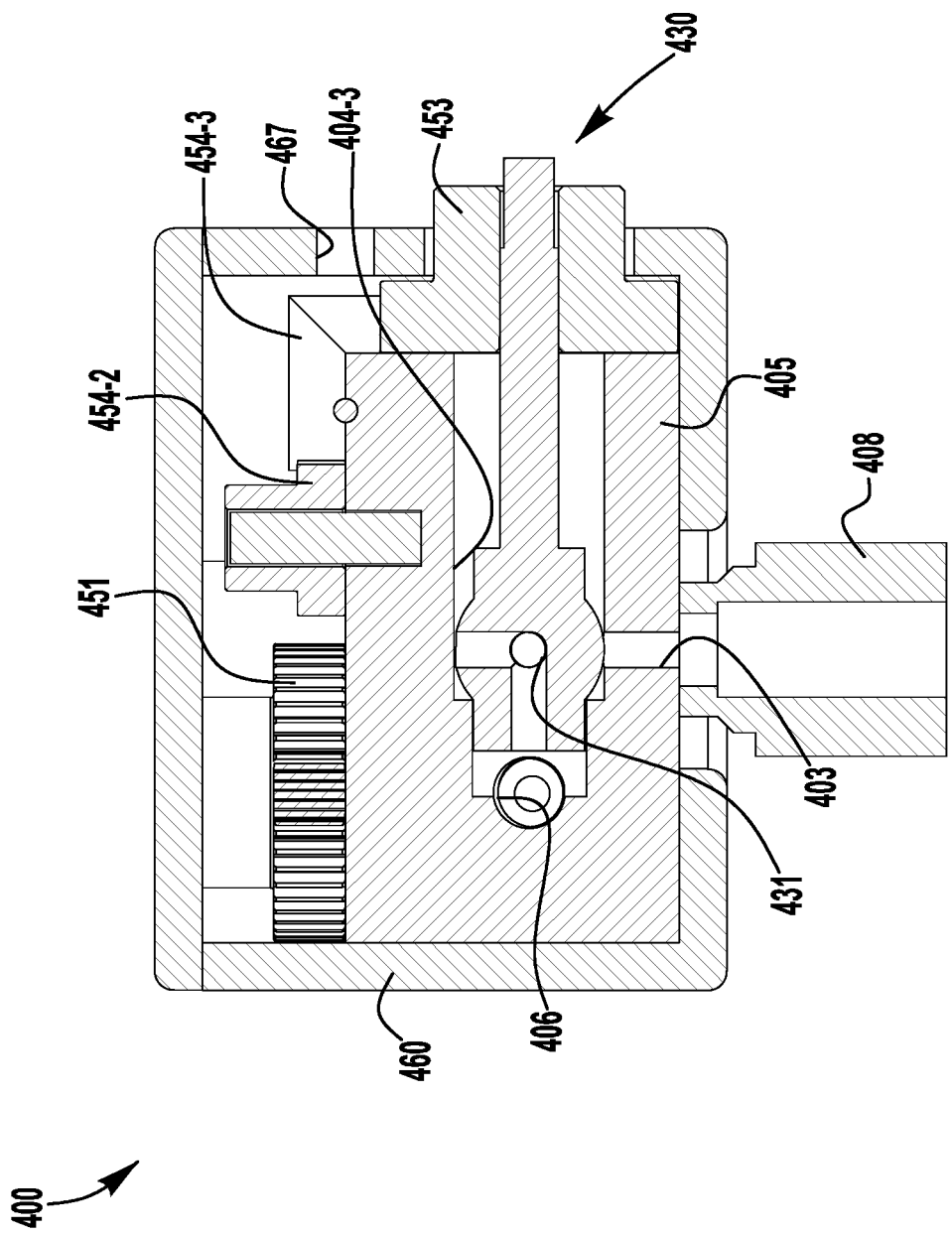
FIG. 11A is a side cross-sectional view of the three-valve assembly of FIG. 8, shown with the bleed valve element in the closed configuration.
Figure 12A:
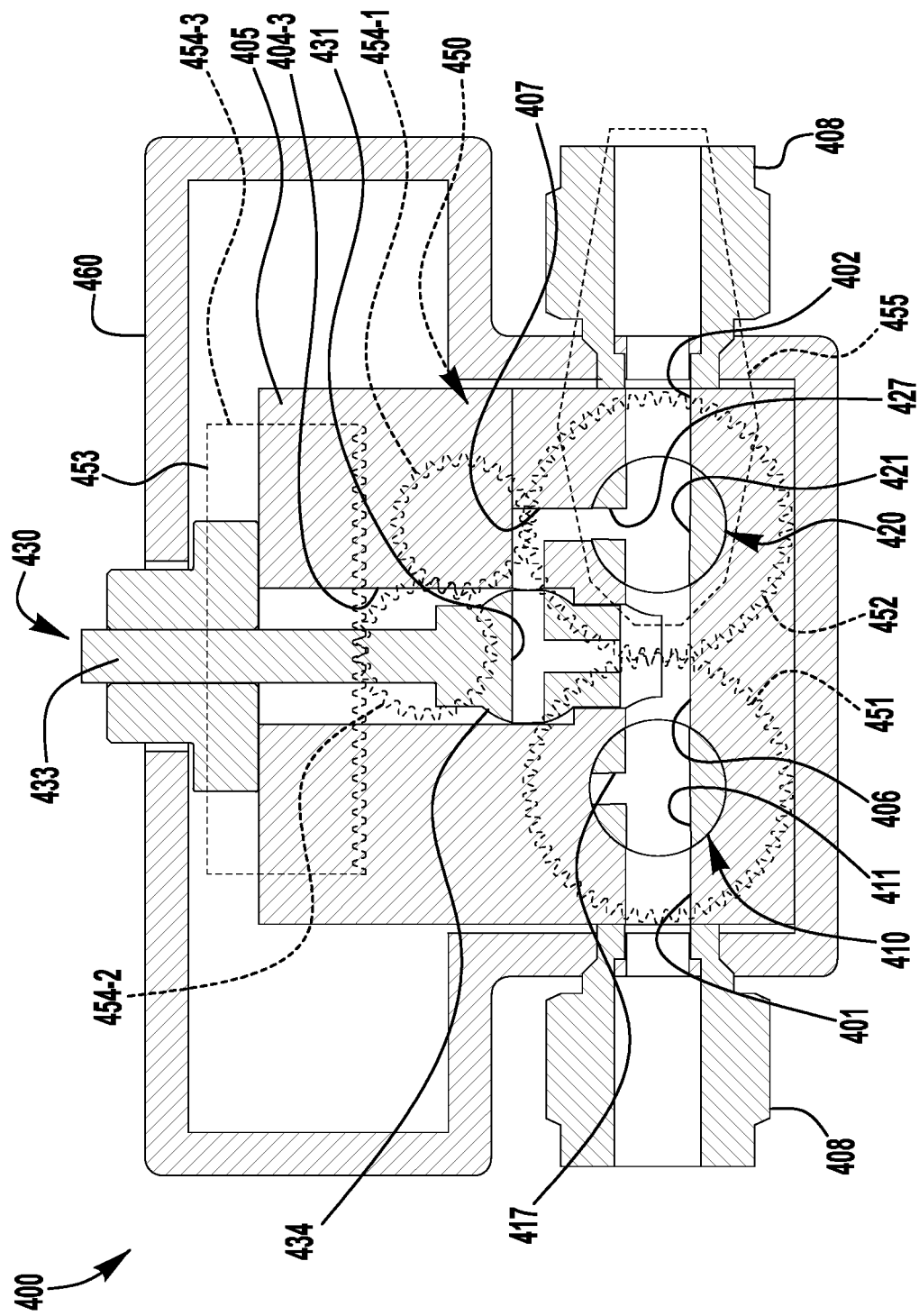
FIG. 12A is a bottom cross-sectional view of the three-valve assembly of FIG. 8, shown in an open or "on" configuration.

FIG. 12A illustrates the exemplary assembly 400 in a first ("on") configuration, in which the upstream and downstream valve elements 410, 420 are each in an open position, with the upstream and downstream valve element passages 411, 421 aligned with the upstream and downstream end ports 401, 402 and the internal through passage 406, and the bleed valve element 430 is in a closed position (as best shown in FIG. 11A), with the bleed valve element passage 431 misaligned with the vent port 203 to block flow between the internal through passage second leg 206-2 and the vent port 203.

Figure 11B:
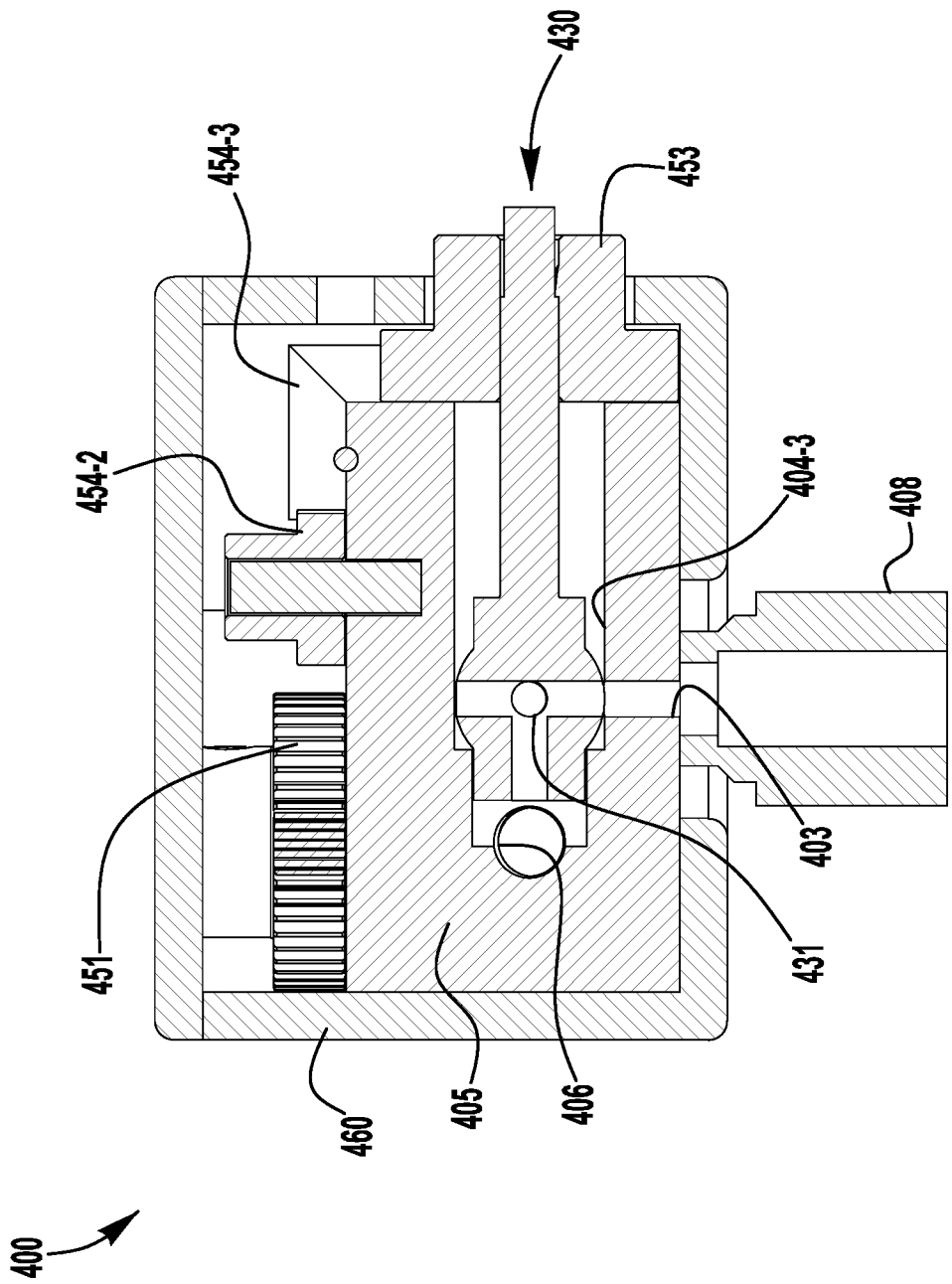
FIG. 11B is a side cross-sectional view of the three-valve assembly of FIG. 8, shown with the bleed valve element in the downstream vent configuration.
Figure 12B:
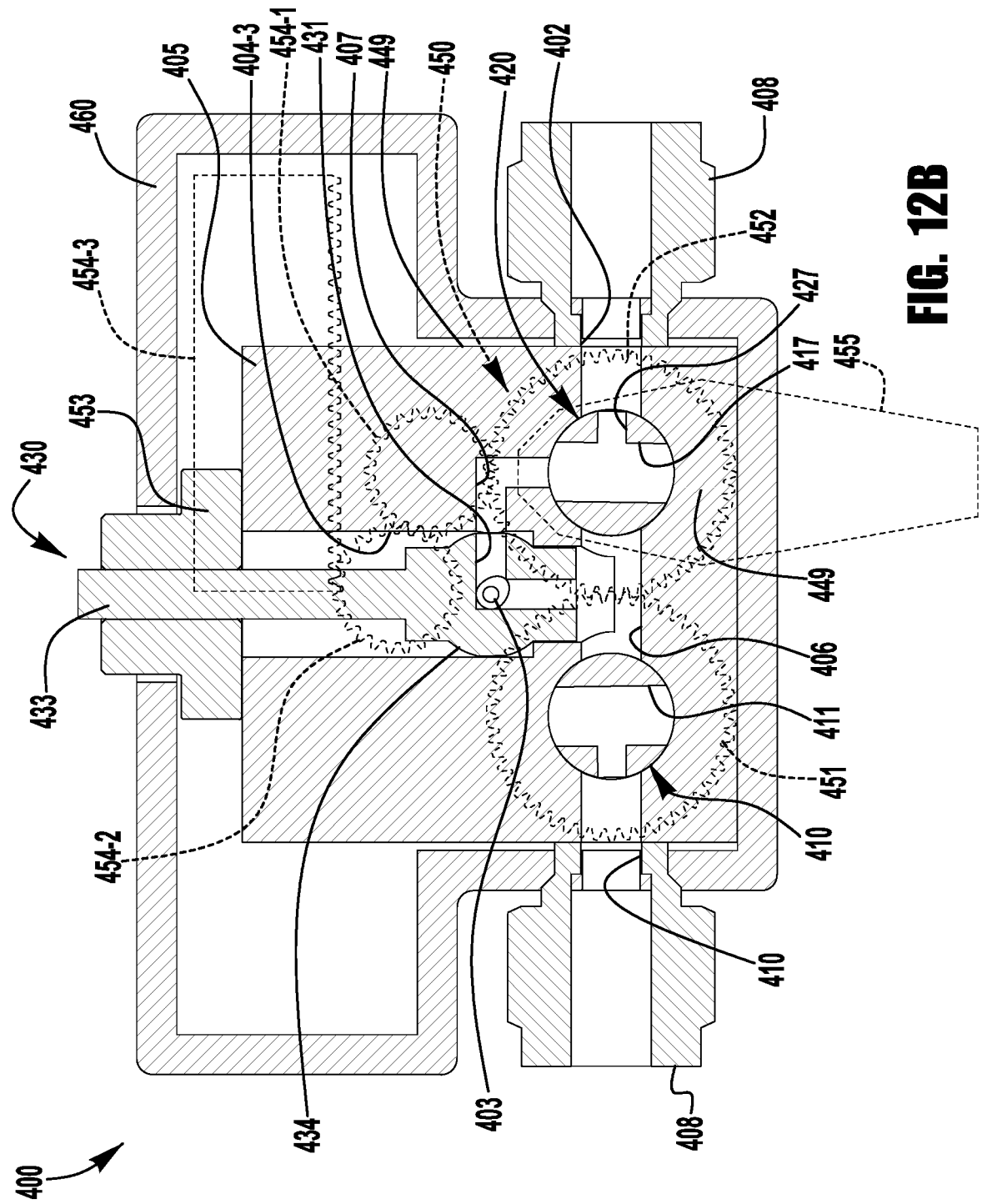
FIG. 12B is a bottom cross-sectional view of the three-valve assembly of FIG. 8, shown in a closed, downstream vent configuration.

FIG. 12B illustrates the exemplary assembly 400 in a second ("downstream vent") configuration, in which the upstream valve element 410 is in a closed position, the downstream valve element 420 is in a vented closed position, and the bleed valve element 430 is in a downstream vent position (as best shown in FIG. 11B). To adjust the exemplary assembly 400 to the downstream vent configuration, the valve handle 455 is rotated a quarter-turn (90°) clockwise from the "on" configuration, such that the rotationally fixed second gear 452 and downstream valve element 420 are rotated a quarter-turn clockwise. The second gear 452 directly drives the first gear 451 and upstream valve element 410 to rotate a quarter-turn counterclockwise, and indirectly drives, through the first and second spur gears 454-1, 454-2 and rack gear 454-3, the third gear 453 and bleed valve element 430 to rotate a quarter-turn counterclockwise. As shown, the upstream valve element passage 411 is misaligned with the internal through passage 406 to shut off upstream fluid flow to the internal through passage. The downstream valve element passage 421 is aligned with the internal vent passage 407 and the downstream vent passage 427 is aligned with the downstream port 402, and the bleed valve element passage 431 is aligned with each of the internal through passage 406, the internal vent passage 407, and the vent port 403, to permit flow of pressurized fluid from the internal through passage and downstream port to the vent port.

Figure 12C:
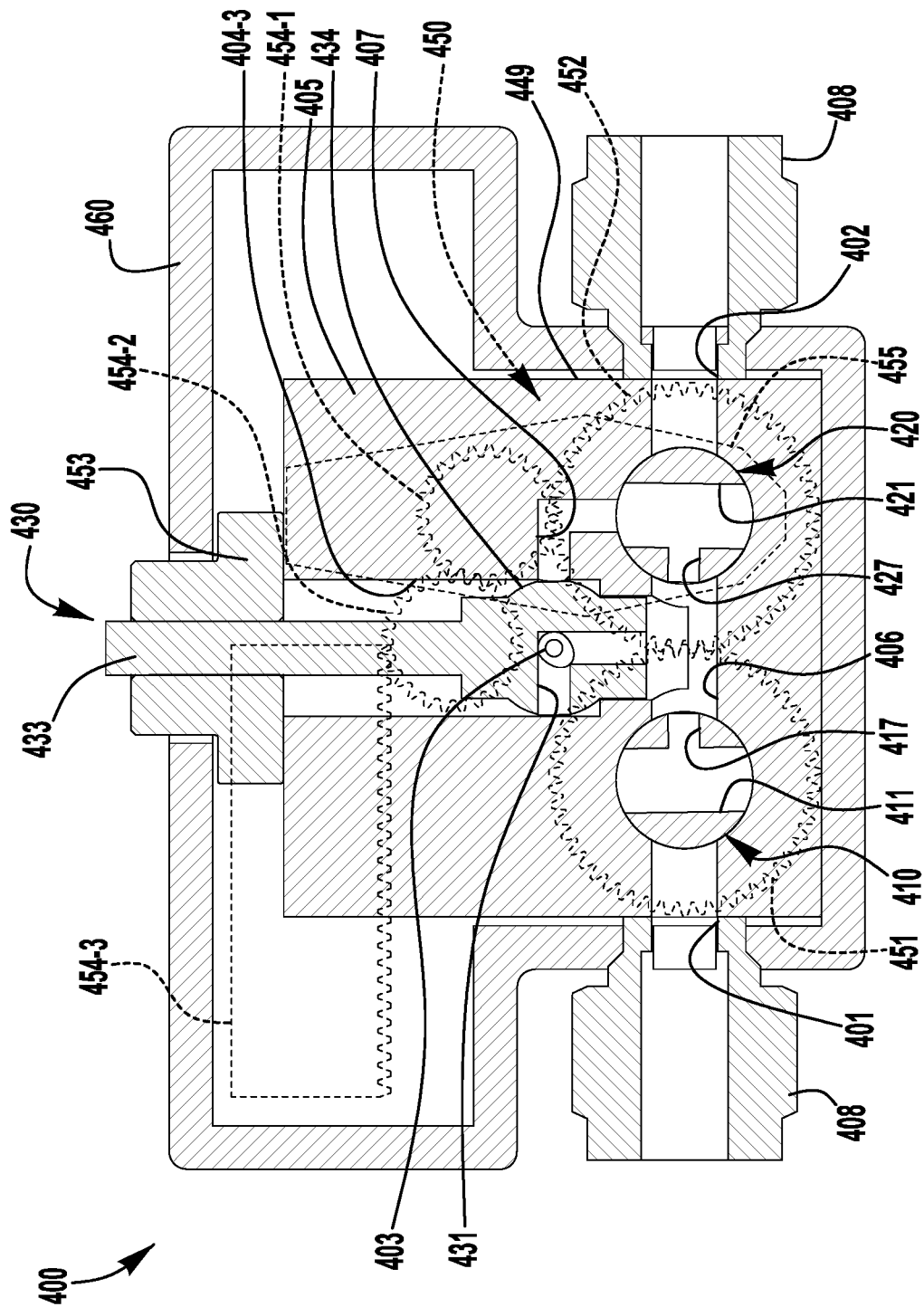
FIG. 12C is a bottom cross-sectional view of the three-valve assembly of FIG. 8, shown in a closed, internal bleed configuration.

FIG. 12C illustrates the exemplary assembly 400 in a third ("bleed") configuration, in which the upstream and downstream valve elements 410, 420 are each in an internally vented closed position, and the bleed valve element 430 is in an internal vent position. To adjust the assembly to the "bleed" configuration, the valve handle 455 is rotated a quarter-turn (90°) counterclockwise from the "on" configuration, such that the rotationally fixed second gear 452 and downstream valve element 420 are rotated a quarter-turn counterclockwise. The second gear 452 directly drives the first gear 451 and upstream valve element 410 to rotate a quarter-turn clockwise, and indirectly drives, through the first and second spur gears 454-1, 454-2 and rack gear 454-3, the third gear 453 and bleed valve element 430 to rotate a quarter-turn clockwise. As shown, the upstream and downstream valve element passages 411, 421 are misaligned with the upstream and downstream end ports 401, 402 to shut off upstream and downstream fluid flow to the internal through passage 406, the downstream valve element passage 421 is aligned with the internal vent passage 407, and the upstream and downstream vent passages 417, 427 are aligned with the internal through passage 406. The bleed valve element passage 431 is aligned with each of the internal through passage 406 and the vent port 403 to permit flow of pressurized fluid from the internal through passage 406 and the upstream and downstream valve element passages 411, 421 to the vent port 403.

Similar to the embodiment of FIGS. 2-5C, the assembly of FIGS. 8-12C may be provided with a bracket, plate or other structure (not shown) carrying indicia for identifying the valve conditions corresponding to each actuator position. In other embodiments, a portion of the actuation mechanism may be configured to provide valve position identification. For example, a portion of the actuation mechanism (e.g., one of the gears) may be provided with indicia that align with an indicating feature (e.g., a window or marked arrow) to identify the set valve configuration. In the illustrated embodiment, the rack gear 454-3 is provided with position identifying indicia 454-3' that align with a window 467 in the casing 460 to provide visual indication of a selected one of the on ("Open"), downstream vent ("Vent"), and bleed ("Bleed") configurations when the rack gear 454-3 is in a position corresponding to the selected configuration.

In some applications, it may be desirable to limit actuation of the valve assembly 400 to one of the two vent/bleed configurations. In such an arrangement, a stop pin or other stop structure may be installed (for example, in an aperture in the valve casing 460) to prevent movement of the handle from one of the downstream vent and bleed positions. In other embodiments, additionally or alternatively, the valve handle 455 may be a "latch-lock" style handle having a mechanism for securing the handle against inadvertent or unauthorized actuation to a different valve configuration (e.g., by securing a padlock shackle through a release latch of the latch lock mechanism).

In other applications, it may be desirable to cycle the valve assembly from the "on" configuration to the "downstream vent" configuration, and then from the "downstream vent" configuration to the "bleed" configuration, consistent with the use of the valve assembly 100 of FIGS. 1A-1C, as described above. Similar to the embodiment of FIGS. 6A-6C, a multi-plane actuator mechanism (e.g. the mechanism 450 of FIGS. 8-12C) may be configured to allow for operative disengagement of the valve handle from the upstream valve element when the valve handle is rotated beyond the downstream vent position toward the internal bleed position, thereby maintaining the upstream valve element in the closed position while the downstream valve element is rotated through the open position to the internal bleed position.

FIGS. 13A-13D illustrate an exemplary three-valve (e.g., double block and bleed) assembly 500 similar to the assembly of FIGS. 8-12C, including a single valve actuator mechanism 550 operatively connected with first (upstream), second (downstream), and third (bleed) valve elements 510, 520, 530 (e.g., with ported ball and upper stem portions, as described above) assembled with a valve body 505 to control flow between a first (upstream) end port 501, a second (downstream) end port 502, and a third (vent) port 503 of the valve body, which may include attached (e.g., welded) end connections 508, such as tube fittings, as shown. In the illustrated embodiment, the valve body 505 includes an internal through passage 506 extending between the upstream valve element 510 and the downstream valve element 520, and an internal vent passage 507 extending between the downstream valve element and the bleed valve element 530.

In the illustrated example, the single valve actuator mechanism 550 includes a valve handle 555 rotationally fixed with the downstream valve element 520, and first, second, and third interlocking gears 551, 552, 553 rotationally fixed with each of the upstream, downstream, and bleed valve elements 510, 520, 530, for operative connection between the valve handle 555 and the upstream and bleed valve elements 510, 530. One or more intermediary gears may be used to drive rotational movement of the third gear 553 and bleed valve element 530 around a horizontal axis. In the illustrated embodiment, the second gear 552 is operatively connected with the third gear 553 by first and second spur gears 554-1, 554-2, and rack gear 554-3 having horizontal teeth meshing with the second spur gear, and vertical teeth meshing with the third gear.

Figure 13A:
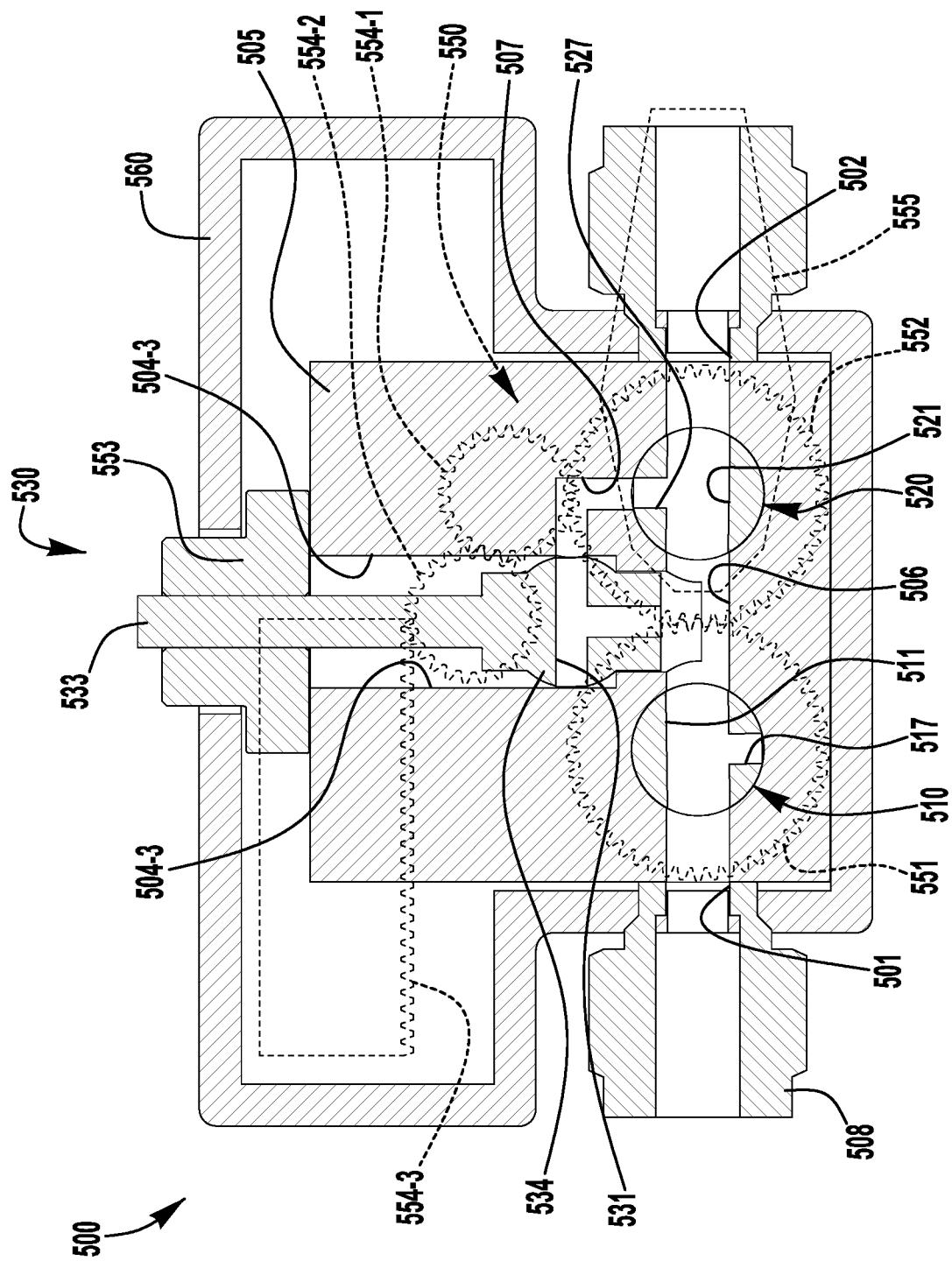
FIG. 13A is a top cross-sectional view of an exemplary three-valve double block and bleed assembly having a single actuator mechanism, according to another exemplary embodiment of the present disclosure, with the three-valve assembly shown in an open or "on" configuration.

FIG. 13A illustrates the exemplary assembly 500 in a first ("on") configuration, in which the upstream and downstream valve elements 510, 520 are each in an open position, and the bleed valve element 530 is in a closed position. As shown, the upstream and downstream valve element passages 511, 521 are aligned with the upstream and downstream end ports 501, 502 and the internal through passage 506, and the bleed valve element passage 531 is misaligned with the vent port 503 to block flow between the upstream and downstream valve element passages 511, 521 and the vent port 503.

In the illustrated interlocking gear arrangement, rotation of the valve handle 555 and the second gear 552 (and downstream valve element 520) a quarter turn (90°) in a first, clockwise direction from the "on" position to the "downstream vent" position drives rotation of the first and third gears 551, 553 a quarter turn (90°) in an opposite second, counterclockwise direction to rotate the upstream and bleed valve elements 510, 530 to their downstream vent positions. The second gear 552 directly drives the first gear 551 and upstream valve element 510 to rotate a quarter-turn counterclockwise, and indirectly drives, through the first and second spur gears 554-1, 554-2 and rack gear 554-3, the third gear 553 and bleed valve element 530 to rotate a quarter-turn counterclockwise.

Figure 13B:
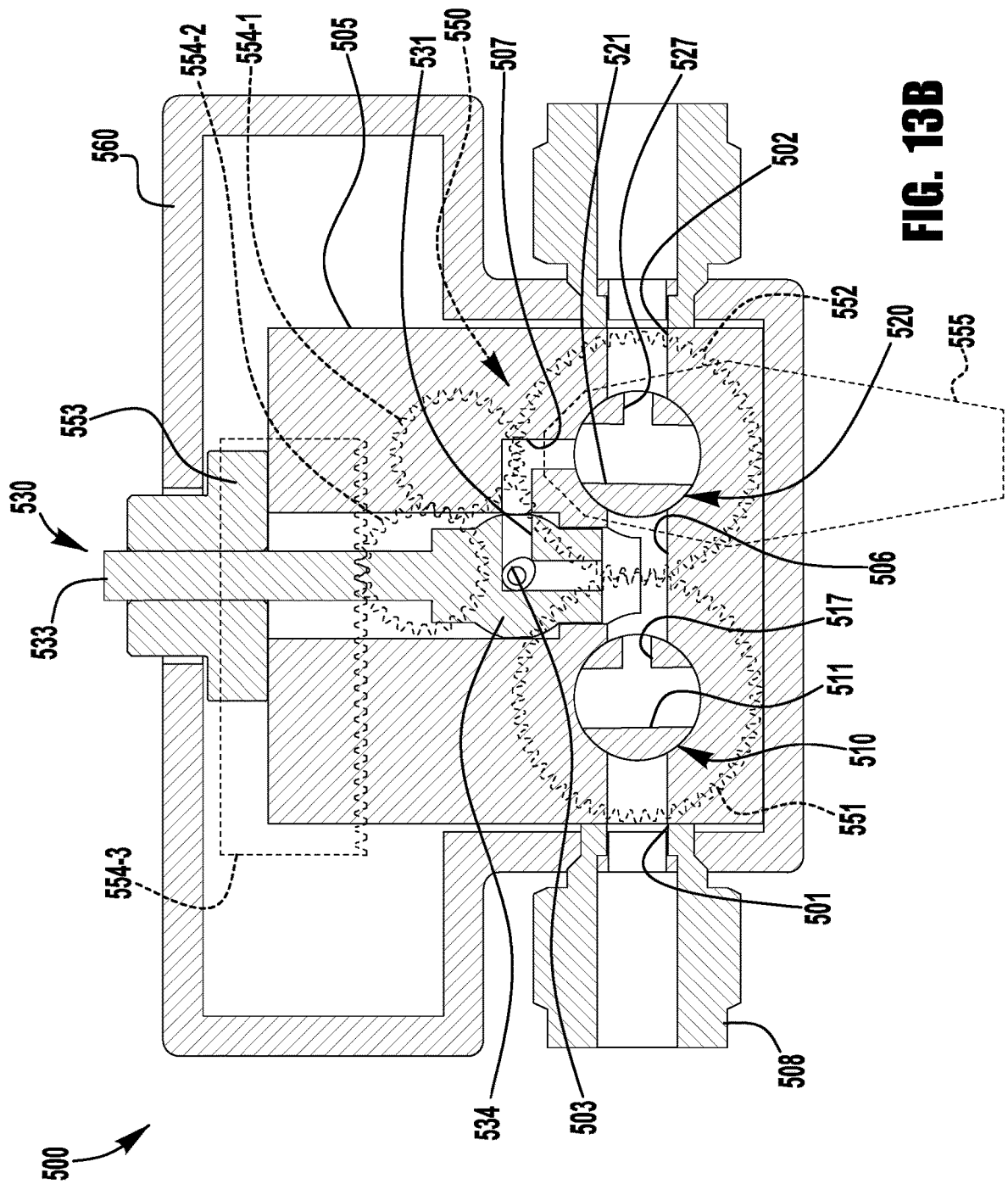
FIG. 13B is a top cross-sectional view of the three-valve assembly of FIG. 13A, shown in a closed, downstream vent configuration.

FIG. 13B illustrates the exemplary assembly 500 in the downstream vent configuration, in which the upstream valve element 510 is in a closed position, the downstream valve element 520 is in a vented closed position, and the bleed valve element 530 is in an open, downstream vent position. As shown, the upstream valve element passage 511 is misaligned with the inlet port 501 to shut off upstream fluid flow to the internal through passage 506. The downstream valve element passage 521 is aligned with the internal vent passage 507 and the downstream vent passage 527 is aligned with the downstream port 502. The bleed valve element passage 531 is aligned with each of the internal vent passage 507, the internal through passage 506, and the vent port 503 to permit flow of pressurized fluid from the internal through passage 506 and downstream port 502 to the vent port 503.

In the illustrated embodiment, the actuator mechanism 550 is configured to allow for operative disengagement of the upstream valve element 510 from the valve handle 555 when the valve handle is rotated beyond the downstream vent position toward the internal bleed position, thereby maintaining the upstream valve element in the closed position while the downstream valve element 520 is rotated through the open position to the internal bleed position. To adjust the assembly to the "bleed" configuration, the valve handle 555 is rotated a half-turn clockwise from the "downstream vent" configuration (i.e., from the 90° position to the 270° position), such that the rotationally fixed downstream valve element 520 is rotated a half-turn counterclockwise, and the upstream valve element 510 remains in the downstream vent position, disengaged from the valve handle.

Figure 14A:
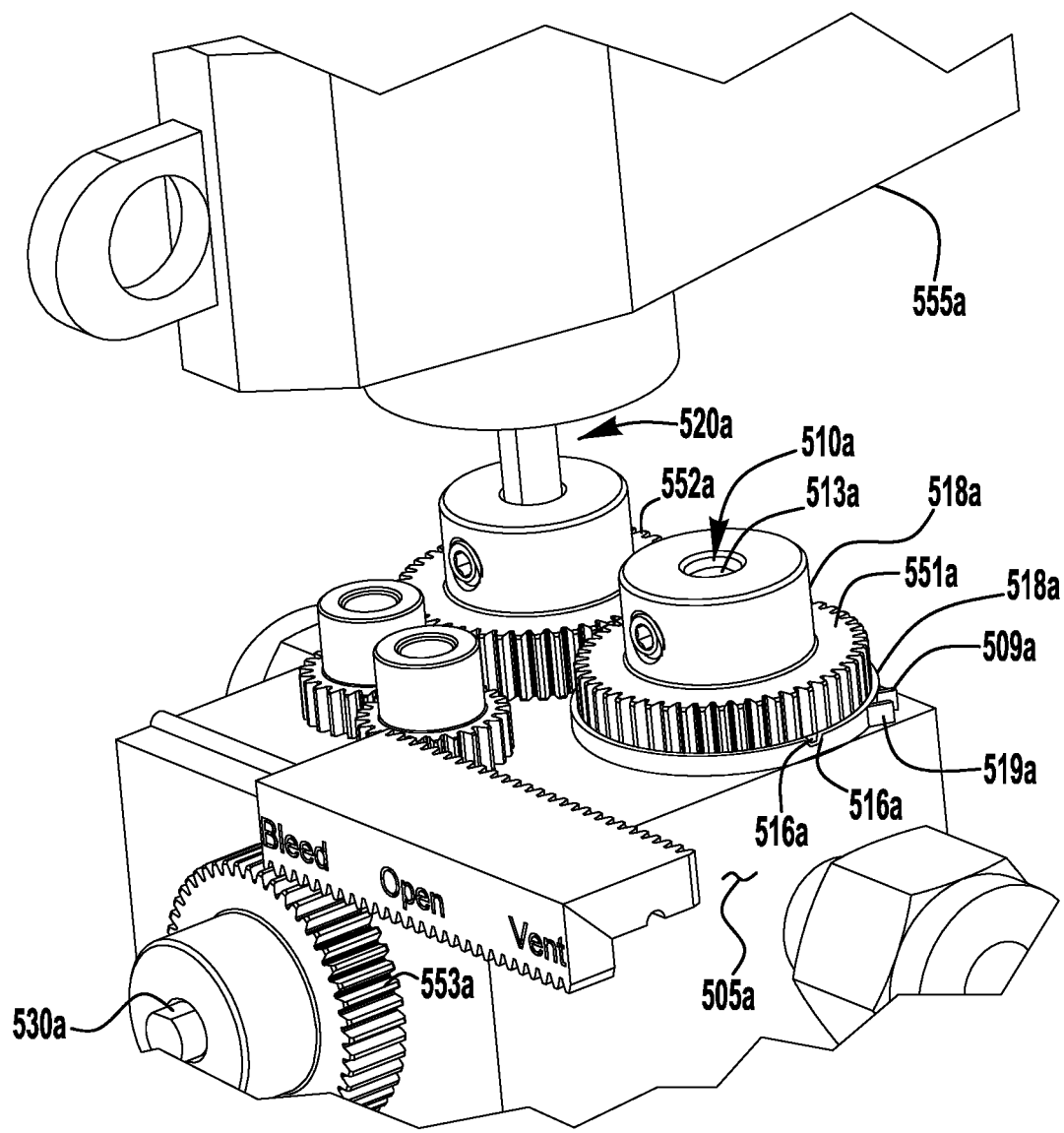
FIG. 14A is a schematic view of an exemplary single actuator mechanism providing for operative disengagement of the upstream valve element from the valve actuator, according to an exemplary embodiment of the present disclosure.

Many different mechanisms may be utilized for operatively disengaging the upstream valve element from the valve actuator (e.g., handle) when the valve actuator is rotated beyond the downstream vent position toward the internal bleed position. As one example, as schematically shown in FIG. 14A, an actuator mechanism 550a may include an upstream valve element 510a having a stop member 519a (e.g., on collar 518a secured to valve stem 513a) preventing rotation of the upstream valve element beyond the downstream vent position (e.g., by engaging a corresponding stop portion 509a on the valve body 505a), and a first detent feature 516a that is disengageable from a second detent feature 556a on the first gear 551a to permit continued rotation of the first gear 551a, without co-rotation of the upstream valve element 510a, when the valve handle 555a and the second gear 552a are rotated beyond the downstream vent position toward the internal bleed position. In some embodiments, the detent features 516a, 556a may be shaped (e.g., ramped) to automatically disengage when additional rotational force is applied to the valve handle upon engagement of the top member 519a and stop portion 509a. In other embodiments, the mechanism may require an addition operation (e.g., axial pulling or pushing force) to effect disengagement.

When the valve handle 555a is rotated a half-turn clockwise from the "downstream vent" configuration (i.e., from the 90° position to the 270° position) to the "bleed" configuration, the second gear 552a and downstream valve element 520a are rotated a half-turn clockwise, the first and third gears 551a, 553a and bleed valve element 530a are rotated a half turn counterclockwise, and the upstream valve element 510a remains in the downstream vent position, disengaged from the first gear. When the first gear 551a is returned (180° counterclockwise) to the downstream vent position (as driven by rotation the valve handle 555a and second gear 552a), the first and second detent features 516a, 556a re-engage (e.g., by a spring-loaded mechanism) to allow for co-rotation of the first gear 551a and upstream valve element 510a from the downstream vent position back to the "on" position.

Figure 14B:
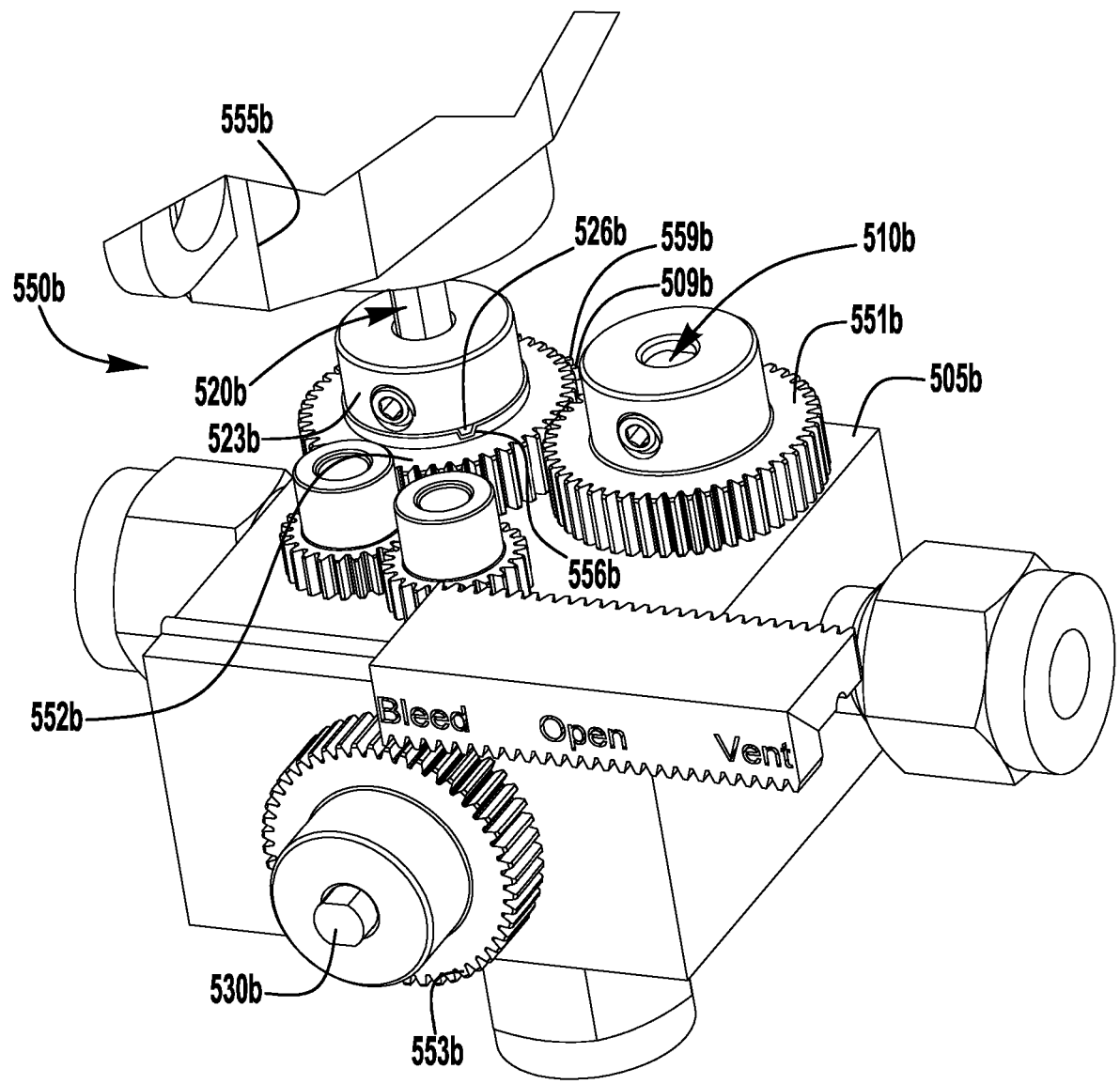
FIG. 14B is a schematic view of an exemplary single actuator mechanism providing for operative disengagement of the upstream and bleed valve elements from the valve actuator, according to another exemplary embodiment of the present disclosure.

In another embodiment, as schematically shown in FIG. 14B, an actuator mechanism 550b may include a stop member 529b preventing rotation of the second gear 552b beyond the downstream vent position (e.g., by engaging a corresponding stop portion 509b on the valve body 505b), and a first detent feature 528b that is disengageable from a second detent feature 558b on the second gear 551b to permit continued rotation of the valve handle 555b and downstream valve element 520b beyond the downstream vent position toward the internal bleed position. When the valve handle 355b and downstream valve element 320b are rotated a half-turn counterclockwise from the "downstream vent" configuration (i.e., from the 90° position to the 270° position) to the "bleed" configuration, the first, second, and third gears 551b, 552b, 553b and the upstream valve and bleed valve elements 510b, 530b remain in the downstream vent position, disengaged from the valve handle 555b. When the valve handle 555b and second gear 551b are returned (180° clockwise) to the downstream vent position, the first and second detent features 526b, 355b re-engage (e.g., by a spring-loaded mechanism) to allow for co-rotation of the second gear 552b and downstream valve element 520b, the first gear 551b and upstream valve element 510b, and the third gear 553b and bleed valve element 530b from the downstream vent position back to the "on" position.

Figure 13C:
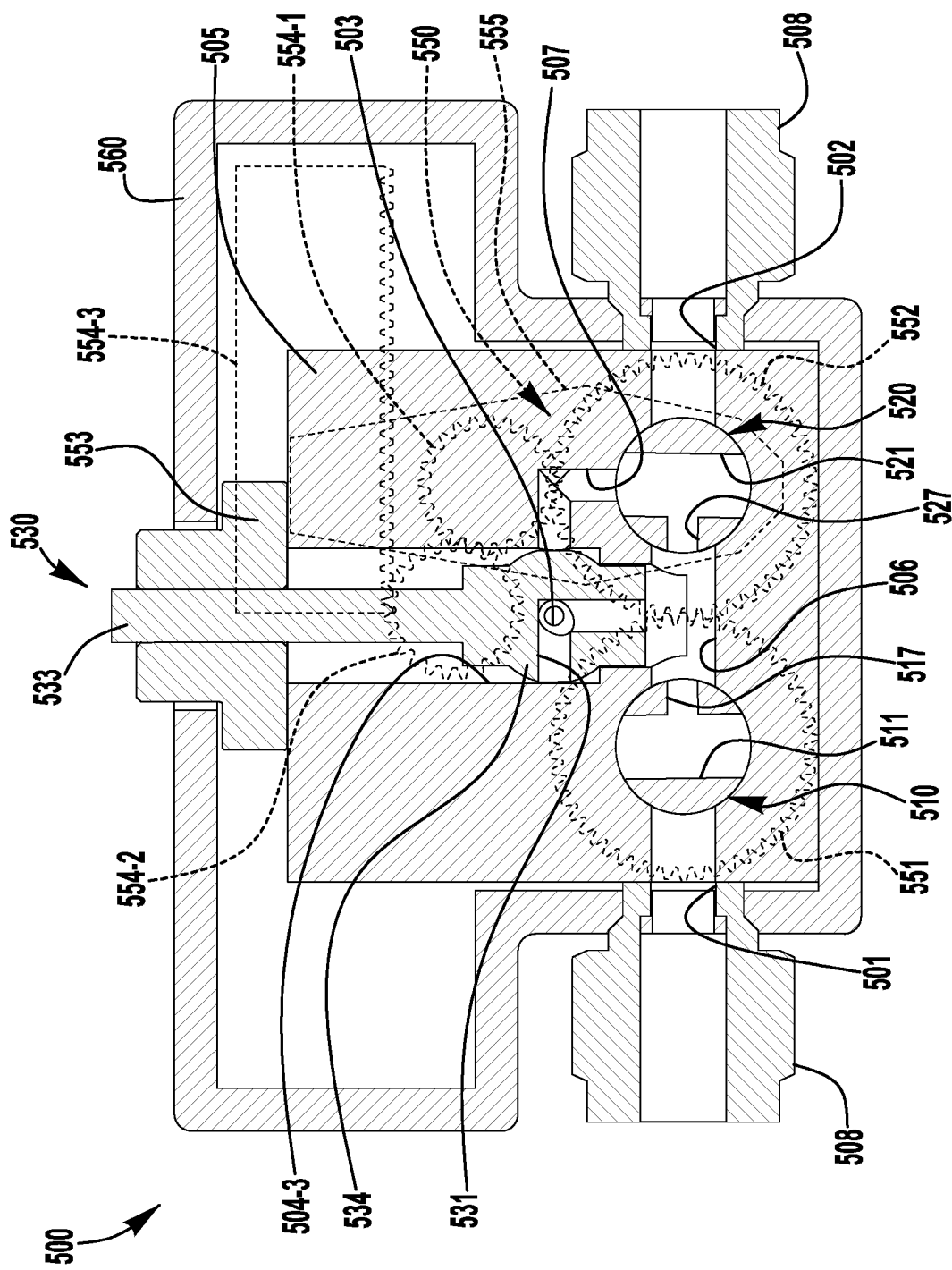
FIG. 13C is a top cross-sectional view of the three-valve assembly of FIG. 13A, shown in a closed, internal bleed configuration.
Figure 13D:
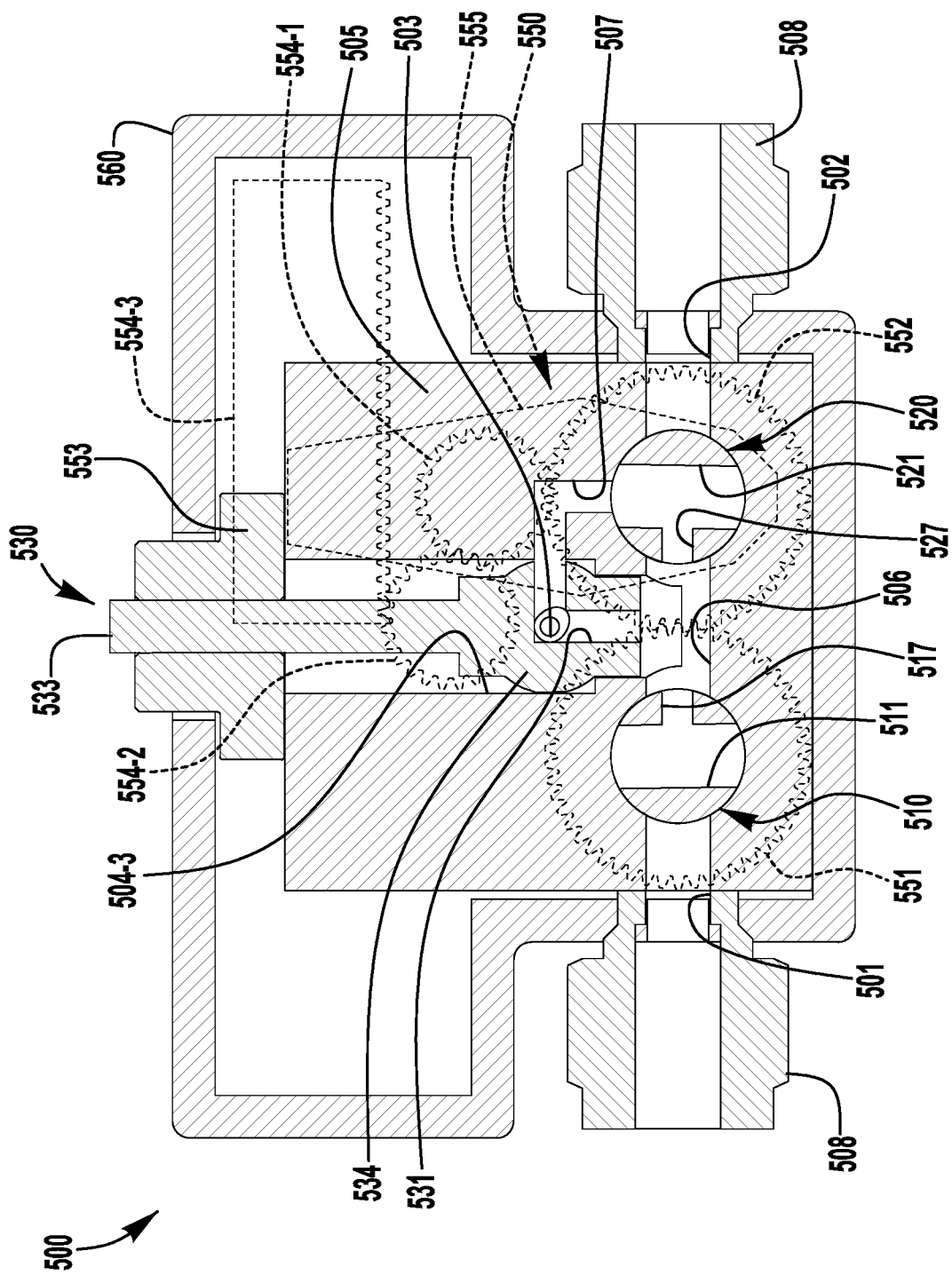
FIG. 13D is a top cross-sectional view of the three-valve assembly of FIG. 13A, shown in another closed, internal bleed configuration.

FIGS. 13C and 13D illustrate the exemplary assembly 500 in the bleed configuration, in which the upstream and downstream valve elements 510, 520 are each in an internally vented closed position, and the bleed valve element 530 is in an open or venting position. As shown, with the upstream valve element 510 in the same "downstream vent" orientation, the upstream valve element passage 511 remains misaligned with the inlet port 301 to shut off upstream fluid flow to the internal through passage 506 (as with the downstream vent configuration), and the upstream vent passage 517 is aligned with the internal through passage 506. The downstream valve element passage 521 is misaligned with the outlet port 502 and the downstream vent passage 527 is aligned with the internal through passage 506. With the bleed valve element 530 rotated 180° from the "downstream vent" orientation (shown in FIG. 13C, as provided, for example, with the mechanism of FIG. 14A), or maintained in the same "downstream vent" orientation (shown in FIG. 13D, as provided, for example, with the mechanism of FIG. 14B), the bleed valve element passage 531 is aligned with each of the internal through passage 506 and the vent port 503 to permit flow of pressurized fluid from the internal through passage 506 and upstream and downstream valve element passages 511, 521 to the vent port 503.

In still other embodiments, a single valve actuator arrangement may be provided for a two-valve, single block and bleed ("SBB") manifold arrangement. In some such configurations, a single block and bleed assembly may substantially correspond to the double block and bleed manifold configurations described herein, with the upstream valve element eliminated, and the actuator limited to two positions: (a) a first, open position, corresponding to an open flowpath configuration in which a first, "single block" valve element is in an open position permitting fluid flow between the first end port and the second end port, and a second, vent or bleed valve element is in a closed position blocking flow between the internal through passage and the vent port; and (b) a second, downstream vent configuration, in which the first valve element is in a closed position blocking flow between the first and second end ports, and the second valve element is in a venting position permitting fluid flow between the second end port and the vent port.

Figure 15A:
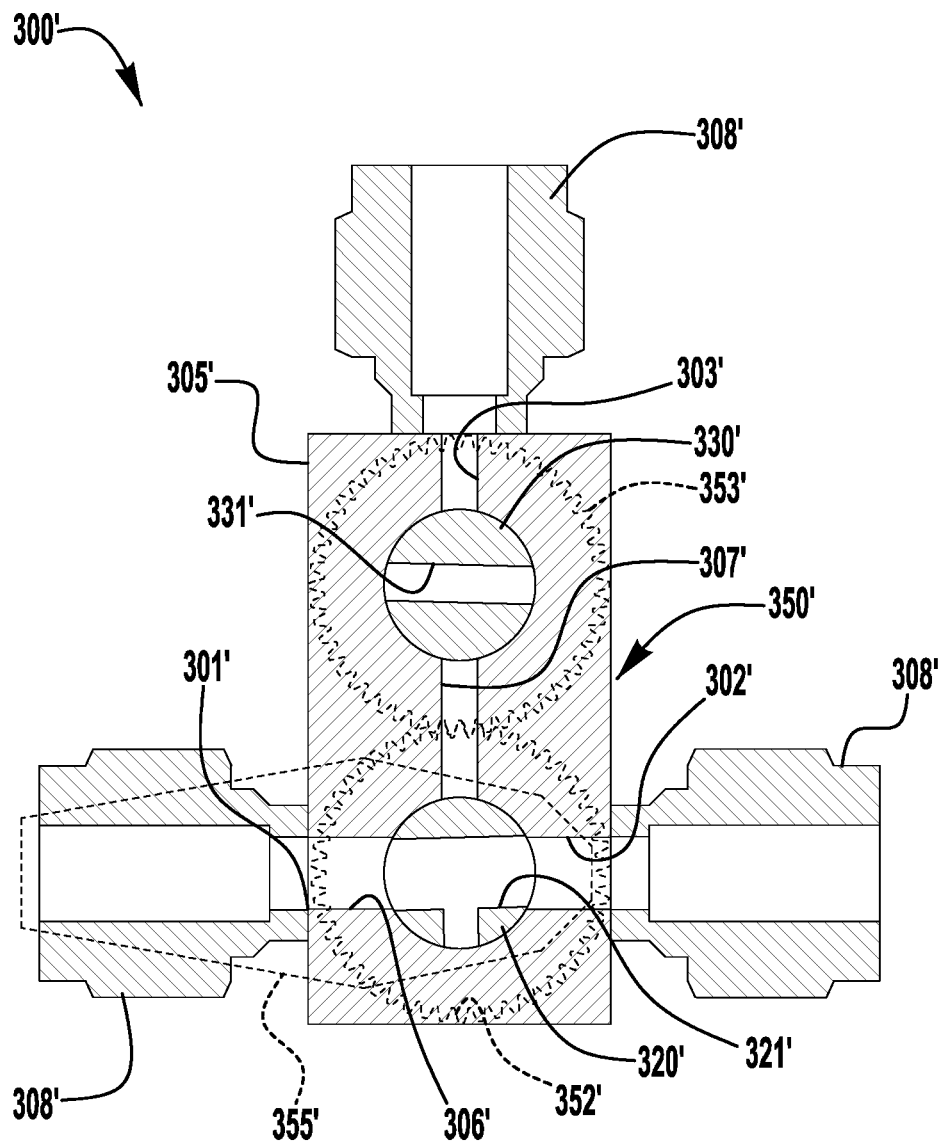
FIG. 15A is a top cross-sectional view of an exemplary two-valve single block and bleed assembly having a single actuator mechanism, according to another exemplary embodiment of the present disclosure, with the two-valve assembly shown in an open or "on" configuration.
Figure 15B:
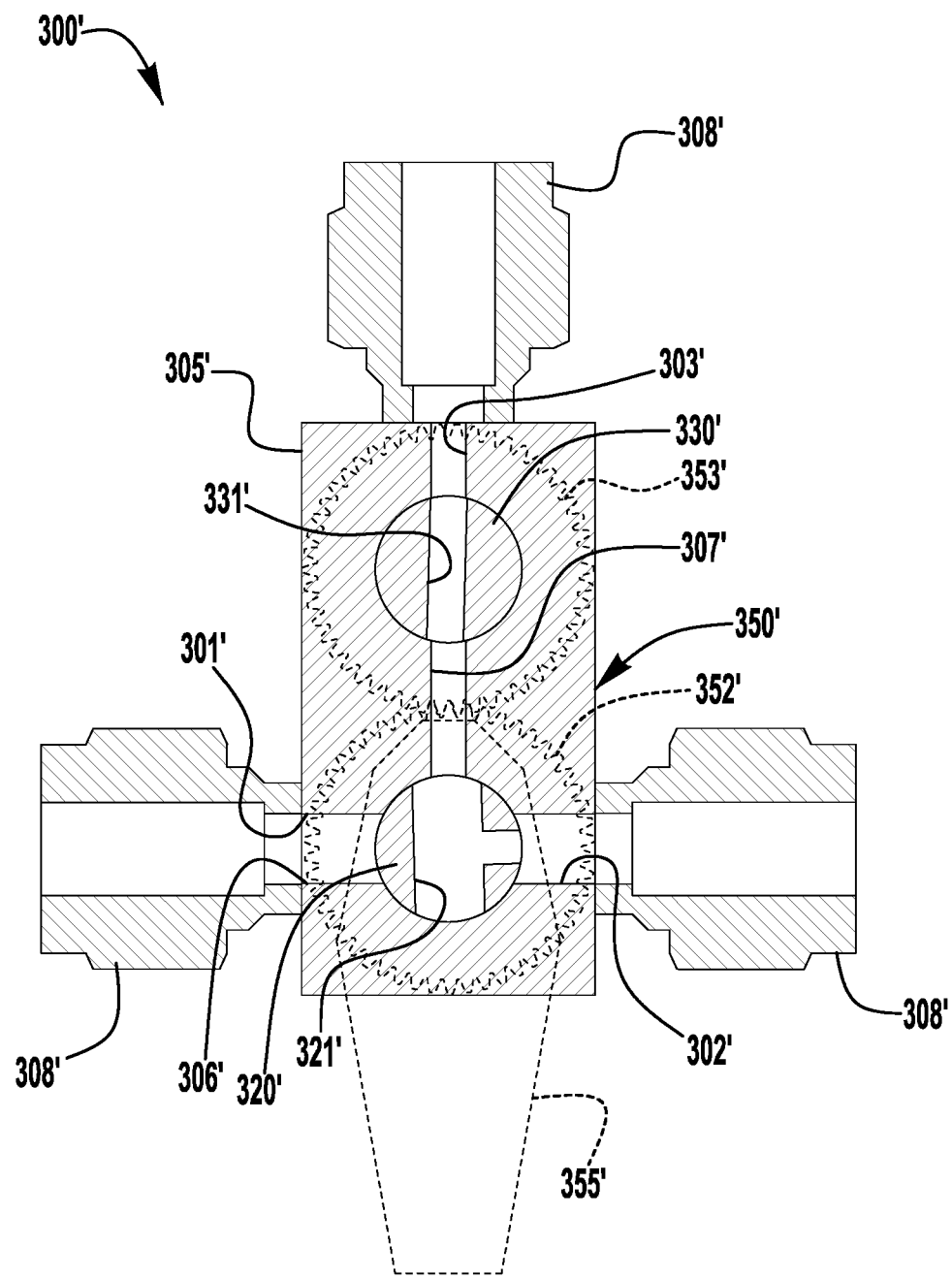
FIG. 15B is a top cross-sectional view of the two-valve assembly of FIG. 15A, shown in a closed, downstream vent configuration.

FIGS. 15A and 15B illustrates an exemplary two-valve (e.g., single block and bleed) assembly 300', which may include components and arrangements similar to the three-valve, double block and bleed assembly 300 of FIGS. 6A-6C, as identified using like reference numbers. The exemplary assembly 300' includes a single valve actuator mechanism operatively connected with first (block), and second (vent/bleed) valve elements 320', 330' (e.g., with ported ball and upper stem portions, as described above) assembled with a valve body 305' to control flow between a first (upstream) end port 301', a second (downstream) end port 302', and a third (vent) port 303' of the valve body, which may include attached (e.g., welded) end connections 308', such as tube fittings, as shown. In the illustrated embodiment, the valve body 305' includes an internal through passage 306' extending between the end ports 301', 302' and an internal vent passage 307' extending between the block valve element 320' and the bleed valve element 330'.

In the illustrated example, the single valve actuator mechanism includes a valve handle 355' rotationally fixed with the block valve element 320', and first and second interlocking gears 352', 353' rotationally fixed with each of the block and bleed valve elements 320', 330', for operative connection between the valve handle 355' and the bleed valve elements 330'. In other embodiments, the valve handle may be rotationally fixed with the bleed valve element, or with neither of the valve elements (e.g., operatively connected with both of the valve elements by an interlocking gear arrangements).

FIG. 15A illustrates the exemplary assembly 300' in a first (open or "on") configuration, in which the block valve element 320' is in an open position, and the bleed valve element 330' is in a closed position. As shown, the block valve element passages 321' is aligned with the upstream and downstream end ports 301', 302', and the bleed valve element passage 331' is misaligned with the vent port 303' and the internal vent passage 307' to block flow between the block valve element passage 321' and the vent port 303'.

In the illustrated interlocking gear arrangement, rotation of the valve handle 355' and the first gear 352' (and block valve element 320') a quarter turn (90°) in a first, counter-clockwise direction from the "on" position to the "downstream vent" position drives rotation of the second gear 353' a quarter turn (90°) in an opposite second, clockwise direction to rotate the bleed valve element 330' to its downstream vent position.

FIG. 15B illustrates the exemplary assembly 300' in the downstream vent configuration, in which the block valve element 320' is in a vented closed position, and the bleed valve element 330' is in an open position. As shown, the block valve element passage 321' is aligned with the internal vent passage 307' and the downstream vent passage 327' is aligned with the downstream port 302'. The bleed valve element passage 331 is aligned with each of the internal vent passage 307 and the vent port 303 to permit flow of pressurized fluid from the internal through passage 306 and downstream port 302 to the vent port 303.

Figure 16A:
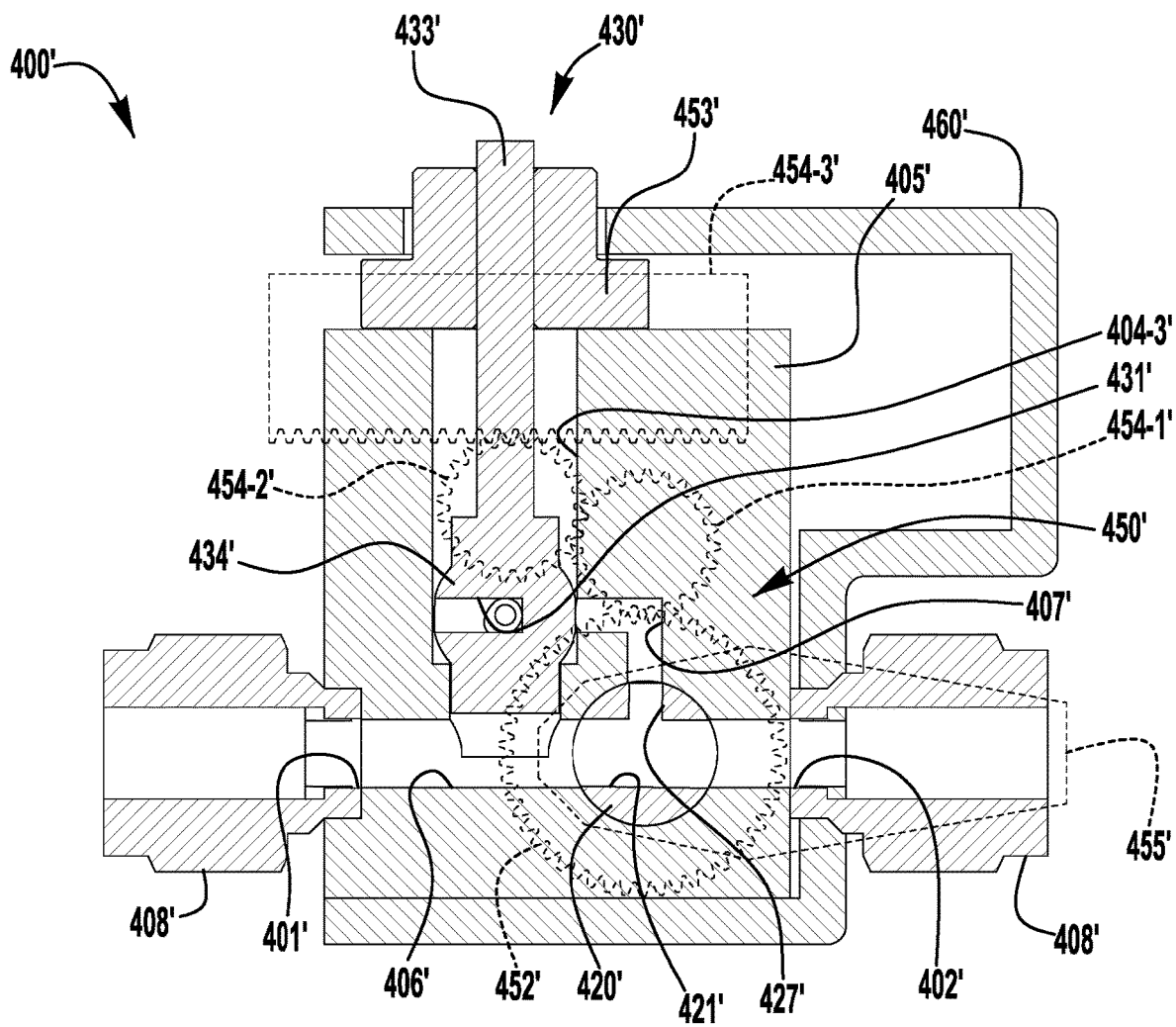
FIG. 16A is a bottom cross-sectional view of an exemplary two-valve single block and bleed assembly having a single actuator mechanism, according to another exemplary embodiment of the present disclosure, with the two-valve assembly shown in an open or "on" configuration.
Figure 16B:
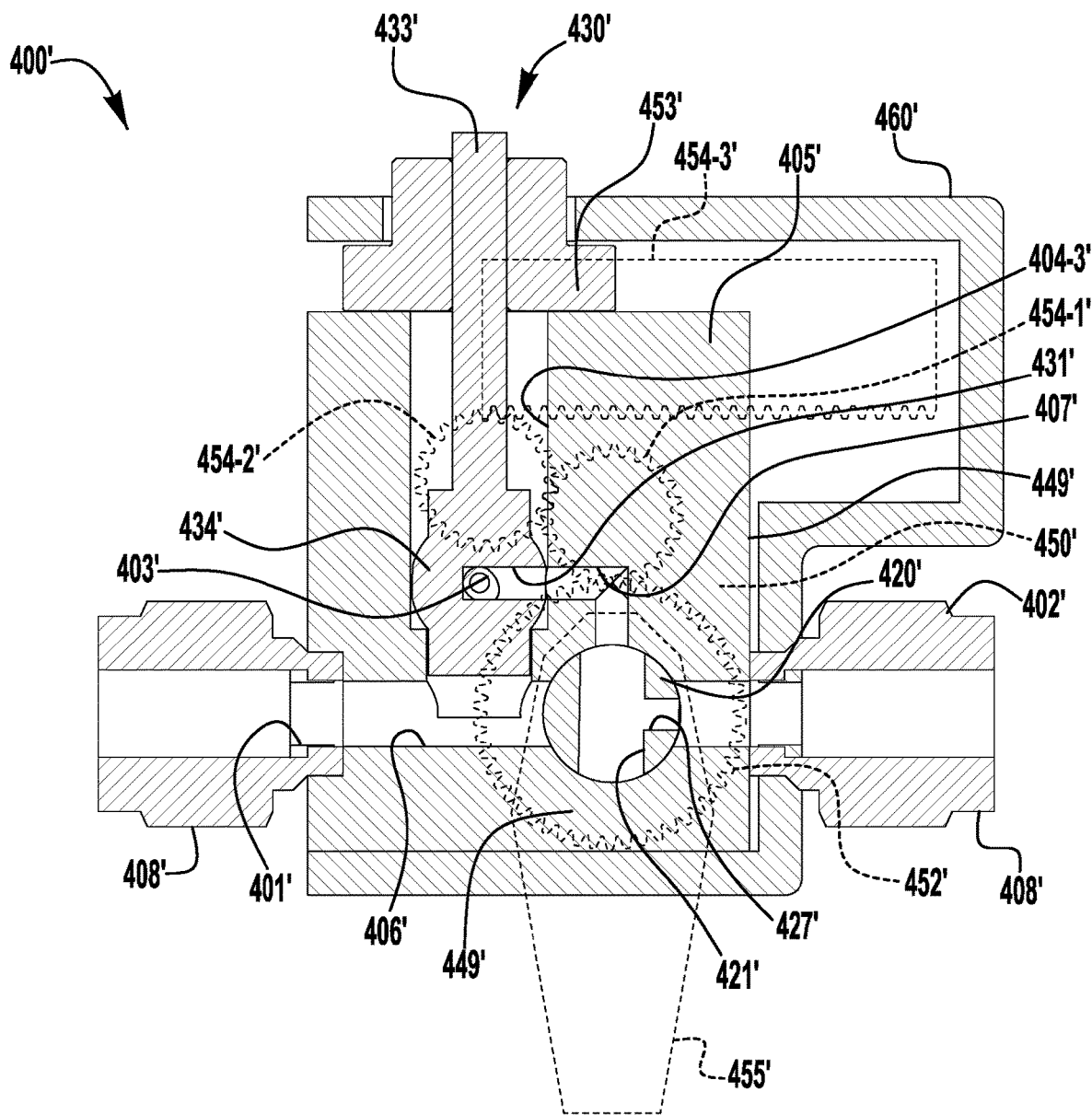
FIG. 16B is a bottom cross-sectional view of the two-valve assembly of FIG. 16A, shown in a closed, downstream vent configuration.

FIGS. 16A and 16B illustrate various views of an exemplary two-valve (e.g., single block and bleed) assembly 400', which may include components and arrangements similar to the three-valve, double block and bleed assembly 400' of FIGS. 8-12C, as identified using like reference numbers. The exemplary assembly 400' includes a single valve actuator mechanism 450' operatively connected with vertically oriented first, block valve element 420', and a horizontally oriented second, bleed valve element 430', assembled with a valve body 405' to control flow between a first (upstream) end port 401', a second (downstream) end port 402', and a third (vent) port 403' of the valve body, which may include attached (e.g., welded) end connections 408', such as tube fittings, as shown. The illustrated assembly 400' includes an outer casing 460' surrounding the valve body 405' and portions of the actuator mechanism 450', for example, to protect the mechanism gears from damage or contamination. While many different types of valve elements may be utilized, in the illustrated embodiment, the valve elements 420', 430' may include lower ported ball portions sealed within corresponding cavities in the valve body (e.g., by plastic seats or packing, not shown) and upper stem portions 423', 433' that extend from the valve cavities for connection with the valve actuator mechanism 450', as shown and described herein with regard to the embodiment of FIGS. 8-12C. In the illustrated embodiment, the valve body 405' includes an internal through passage 406' extending between the end ports 401', 402', and the bleed valve element 430', and an internal vent passage 407' extending between the block valve element 420' and the bleed valve element.

In the illustrated example, the single valve actuator mechanism 450' includes a valve handle 455' rotationally fixed with the block valve element 420' (e.g., secured by a set screw to the upper stem portion), and first and second interlocking gears 452', 453' rotationally fixed with each of the block and bleed valve elements 420', 430', for operative connection between the valve handle 455' and the bleed valve element 430'. One or more intermediary gears may be used to drive rotational movement of the second gear 453' and bleed valve element 430' about a horizontal axis. In the illustrated embodiment, the first gear 452' is operatively connected with the second gear 453' by first and second spur gears 454-1', 454-2' (e.g., rotatable on gear pins assembled with the valve body 405'), and a rack gear 454-3' having horizontal teeth meshing with the second spur gear, and vertical teeth meshing with the third gear, the rack gear being horizontally slidable (e.g., on a guide pin secured with the valve body 405') to translate vertical axis rotation of the second spur gear to horizontal axis rotation of the second gear 453'.

In the illustrated interlocking gear arrangement, rotation of the valve handle 455' and the first gear 452' (and block valve element 420') in a first (e.g., clockwise) direction drives rotation of the second gear 453' (and bleed valve element 430') in an opposite second (e.g., counterclockwise) direction. In other embodiments, different interlocking gear arrangements may be used. For example, the valve handle may be rotationally fixed with the bleed valve element, or with neither of the valve elements (e.g., operatively connected with both of the valve elements by an interlocking gear arrangements).

FIG. 16A illustrates the exemplary assembly 400' in a first ("on") configuration, in which the block valve element 420' is in an open position, with the valve element passage 421' aligned with the upstream and downstream end ports 401', 402' and the internal through passage 406', and the bleed valve element 430' is in a closed position, with the L-shaped bleed valve element passage 431' misaligned with the internal vent passage 407' to block flow between the internal vent passage and the vent port.

FIG. 16B illustrates the exemplary assembly 400' in a second ("downstream vent") configuration, in which the block valve element 420' is in a vented closed position, and the bleed valve element 430' is in a downstream vent position. To adjust the exemplary assembly 400' to the downstream vent configuration, the valve handle 455' is rotated a quarter-turn (90°) clockwise from the "on" configuration, such that the rotationally fixed first gear 452' and block valve element 420' are rotated a quarter-turn clockwise. The first gear 452' indirectly drives, through the first and second spur gears 454-1', 454-2' and rack gear 454-3', the second gear 453' and bleed valve element 430' to rotate a quarter-turn counterclockwise. As shown, the block valve element passage 421' is aligned with the internal vent passage 407' and the downstream vent passage 427' is aligned with the downstream port 402', and the bleed valve element passage 431' is aligned with each of the the internal vent passage 407' and the vent port 403', to permit flow of pressurized fluid from the internal through passage and downstream port to the vent port.

The invention has been described with reference to the preferred embodiments. Modifications and alterations will occur to others upon a reading and understanding of this specification.

We claim:

1. A valve assembly comprising:
   a valve body defining a first end passage extending to a first end port, a second end passage extending to a second end port, an internal through passage extending between the first and second end passages, and a bleed passage extending to a vent port;
   a first valve element disposed in the first end passage and defining a first valve passage;
   a second valve element disposed in the second end passage and defining a second valve passage;
   a third valve element disposed in the bleed passage and defining a third valve passage; and
   a valve actuator operatively connected with each of the first, second, and third valve elements, the valve actuator being movable between:
      a first position corresponding to an open flowpath configuration in which the first and second valve elements are in an open position permitting fluid flow between the first end port and the second end port, and the third valve element is in a closed position blocking flow between the internal through passage and the vent port;
      a second position corresponding to a bleed configuration in which the first and second valve elements are in a first closed position blocking flow between the first and second end ports and the internal through passage, with the first and second valve passages being open to the internal through passage, and the third valve element is in a first switching position permitting fluid flow between the internal through passage and the vent port; and
      a third position corresponding to a downstream vent configuration in which the first and second valve elements are in a second closed position blocking flow between the first and second end ports and the internal through passage, with the second valve passage being open to the second end port, and the third valve element is in a second switching position permitting fluid flow between the internal through passage and the second valve passage.

2. The valve assembly of claim 1, wherein the valve actuator is rotatable between the first position, the second position, and the third position.

3. The valve assembly of claim 1, wherein the valve actuator is rotationally fixed to at least one of the first, second, and third valve elements.

4. The valve assembly of claim 1, wherein the valve actuator is operatively connected to at least one of the first, second, and third valve elements by at least one gear.

5. The valve assembly of claim 1, wherein the valve actuator is rotationally fixed to one of the first, second, and third valve elements, and is operatively connected to the others of the first, second, and third valve elements by at least one gear.

6. The valve assembly of claim 1, wherein the first valve element is rotatable about a first axis, the second valve element is rotatable about a second axis, and the third valve element is rotatable about a third axis.

7. The valve assembly of claim 6, wherein the second axis is parallel to the first axis.

8. The valve assembly of claim 6, wherein the third axis is parallel to the first axis.

9. The valve assembly of claim 6, wherein the third axis is perpendicular to the first axis.

10. The valve assembly of claim 1, wherein the second switching position of the third valve element permits fluid flow between the internal through passage and the vent port.

11. The valve assembly of claim 1, wherein the first valve passage is open to the first end port when the first valve element is in the second closed position.

12. The valve assembly of claim 1, wherein the valve actuator includes a locking mechanism configured to secure the valve actuator in a selected one of the first position, the second position, and the third position.

13. The valve assembly of claim 1, wherein the valve actuator comprises a user rotatable handle.

14. A valve assembly comprising:
   a valve body;
   a first valve element assembled with the valve body and rotatable about a first valve axis;
   a second valve element assembled with the valve body and rotatable about a second valve axis perpendicular to the first valve axis; and
   a valve actuator operatively connected with each of the first and second valve elements, the valve actuator being rotatable about an actuator axis for rotation of the first and second valve elements between first and second positions;
   wherein the valve actuator is operatively connected to the second valve element by a gear mechanism; and
   wherein the gear mechanism comprises a first gear wheel rotatable about a first gear axis codirectional with the first valve axis, a second gear wheel rotatable about a second gear axis codirectional with the second valve axis, and a gear rack having a first row of teeth operatively connected with the first gear wheel and a second row of teeth operatively connected with the second gear wheel.

15. The valve assembly of claim 14, wherein the valve actuator is rotationally fixed to the first valve element.

16. The valve assembly of claim 14, wherein the second gear axis is collinear with the second valve axis.

17. The valve assembly of claim 14, further comprising a housing enclosing the valve body, the first and second valve elements, and the gear mechanism.

18. The valve assembly of claim 17, wherein the housing defines a window that aligns with position identifying indicia on the gear mechanism to provide visual indication when the first and second valve elements are in at least one of the first and second positions.

19. The valve assembly of claim 14, wherein the valve actuator comprises a user rotatable handle.

* * * * *